US008625156B2

(12) United States Patent
Saiki et al.

(10) Patent No.: US 8,625,156 B2
(45) Date of Patent: Jan. 7, 2014

(54) IMAGE FORMING APPARATUS AND CONTROL METHOD THEREOF

(75) Inventors: Tomoyuki Saiki, Suntou-gun (JP); Go Araki, Suntou-gun (JP); Yuuji Takayama, Suntou-gun (JP); Hisashi Ishikawa, Urayasu (JP)

(73) Assignee: Canon Kabushiki Kaisha (JP)

( * ) Notice: Subject to any disclaimer, the term of this patent is extended or adjusted under 35 U.S.C. 154(b) by 1111 days.

(21) Appl. No.: 12/604,549

(22) Filed: Oct. 23, 2009

(65) Prior Publication Data

US 2010/0103442 A1  Apr. 29, 2010

(30) Foreign Application Priority Data

Oct. 24, 2008 (JP) ................. 2008-274864

(51) Int. Cl.
| H04N 1/60 | (2006.01) |
| H04N 1/58 | (2006.01) |
| H04N 1/56 | (2006.01) |
| H04N 1/50 | (2006.01) |
| G06F 3/12 | (2006.01) |
| H04N 1/405 | (2006.01) |
| G06K 15/02 | (2006.01) |
| G03F 3/00 | (2006.01) |
| G03G 15/01 | (2006.01) |

(52) U.S. Cl.
USPC ........... 358/1.9; 358/1.1; 358/3.01; 358/3.03; 358/3.06; 358/3.1; 358/501; 358/518; 358/533; 358/534; 358/401; 399/301; 347/116

(58) Field of Classification Search
None
See application file for complete search history.

(56) References Cited

U.S. PATENT DOCUMENTS

| 4,213,150 A | 7/1980 | Robinson et al. |
| 4,814,886 A | 3/1989 | Kuge et al. |
| 5,068,914 A | 11/1991 | Klees |

(Continued)

FOREIGN PATENT DOCUMENTS

| EP | 1 343 305 A1 | 9/2003 |
| EP | 1 736 835 A1 | 12/2006 |

(Continued)

OTHER PUBLICATIONS

Extended European Search Report issued in corresponding European Patent Appln. No. 09173643.9 dated Feb. 5, 2010, which corresponds to related co-pending U.S. Appl. No. 12/604,521.

(Continued)

Primary Examiner — King Poon
Assistant Examiner — Beniyam Menberu
(74) Attorney, Agent, or Firm — Rossi, Kimms & McDowell LLP

(57) ABSTRACT

An image forming apparatus forms a color image using image carriers for a plurality of colors by electrophotography. The image forming apparatus stores, for each color, information on the shift amount between an ideal scanning line and an actual scanning line in the main scanning direction on the image carrier. For each color, a color misregistration correction amount calculation unit converts a readout address in a bitmap memory (403), based on the stored shift amount information, and reads out image data. A color misregistration correction unit (404) performs tone correction for the readout image data based on the address, outputting image data containing the value of the decimal part. A multi-level error diffusion unit (405) performs quantization by multi-level error diffusion processing for the tone-corrected image data containing the value of the decimal part.

16 Claims, 13 Drawing Sheets

(56) References Cited

U.S. PATENT DOCUMENTS

| | | |
|---|---|---|
| 5,208,684 A | 5/1993 | Itoh |
| 5,270,836 A | 12/1993 | Kang |
| 5,294,996 A | 3/1994 | Sobue |
| 5,339,171 A | 8/1994 | Fujisawa et al. |
| 5,351,312 A | 9/1994 | Sato et al. |
| 5,479,263 A | 12/1995 | Jacobs et al. |
| 5,604,605 A * | 2/1997 | Moolenaar ............... 358/3.03 |
| 5,621,542 A * | 4/1997 | Ohta et al. ............... 358/3.03 |
| 5,649,031 A | 7/1997 | Nakamura et al. |
| 5,708,514 A | 1/1998 | Higuchi et al. |
| 5,822,464 A | 10/1998 | Metcalfe |
| 6,002,493 A | 12/1999 | Case |
| 6,101,285 A | 8/2000 | Fan |
| 6,215,512 B1 | 4/2001 | Imaizumi et al. |
| 6,215,561 B1 | 4/2001 | Kakutani |
| 6,317,524 B1 | 11/2001 | Wu et al. |
| 6,343,158 B1 | 1/2002 | Shiohara |
| 6,347,159 B1 | 2/2002 | Williams et al. |
| 6,529,643 B1 | 3/2003 | Loce et al. |
| 6,552,822 B1 * | 4/2003 | Kishimoto ............... 358/3.03 |
| 6,665,448 B1 | 12/2003 | Maurer |
| 6,816,269 B1 | 11/2004 | Loce et al. |
| 6,906,825 B1 | 6/2005 | Nakahara et al. |
| 7,031,025 B1 | 4/2006 | He et al. |
| 7,064,863 B2 | 6/2006 | Fukuda et al. |
| 7,164,502 B2 | 1/2007 | Nose et al. |
| 7,203,376 B2 | 4/2007 | Takahashi et al. |
| 7,295,701 B2 | 11/2007 | Suzuki et al. |
| 7,339,698 B1 * | 3/2008 | Ohta ........................ 358/1.9 |
| 7,359,091 B2 | 4/2008 | Curry |
| 7,548,655 B2 | 6/2009 | Tatsumi et al. |
| 7,557,962 B2 | 7/2009 | Herron |
| 7,580,074 B2 * | 8/2009 | Kuo et al. ............. 348/333.01 |
| 7,627,192 B2 | 12/2009 | Yokochi |
| 7,636,179 B2 | 12/2009 | Takahashi et al. |
| 7,660,016 B2 | 2/2010 | Ike et al. |
| 7,684,079 B2 | 3/2010 | Takata et al. |
| 7,684,648 B2 | 3/2010 | Miyazawa et al. |
| 7,702,173 B2 | 4/2010 | Gao et al. |
| 7,742,653 B2 | 6/2010 | Imai |
| 7,826,098 B2 | 11/2010 | Suzuki |
| 7,848,591 B2 | 12/2010 | Nakagata et al. |
| 7,936,941 B2 | 5/2011 | Sumiya et al. |
| 7,948,543 B2 | 5/2011 | Watanabe |
| 7,961,977 B2 | 6/2011 | Tanaka |
| 7,995,249 B2 | 8/2011 | Shoda et al. |
| 8,059,910 B2 | 11/2011 | Ishiga |
| 8,063,994 B2 | 11/2011 | Owaki et al. |
| 8,107,772 B2 | 1/2012 | Ohkawa |
| 8,129,990 B2 | 3/2012 | Yamamoto |
| 8,150,198 B2 | 4/2012 | Kubo et al. |
| 8,284,453 B2 | 10/2012 | Yashima et al. |
| 8,331,731 B2 | 12/2012 | Kashibuchi |
| 2002/0039199 A1 | 4/2002 | Nose et al. |
| 2002/0041397 A1 * | 4/2002 | Rombola et al. ........... 358/3.05 |
| 2002/0080377 A1 | 6/2002 | Tonami et al. |
| 2002/0131061 A1 | 9/2002 | Aoyagi et al. |
| 2003/0164973 A1 | 9/2003 | Hisatomi et al. |
| 2004/0010633 A1 * | 1/2004 | Ishikawa ..................... 710/1 |
| 2004/0136034 A1 | 7/2004 | Curry |
| 2005/0062995 A1 | 3/2005 | Loce et al. |
| 2005/0134870 A1 | 6/2005 | Kugo |
| 2005/0144540 A1 | 6/2005 | Fujishiro et al. |
| 2005/0225806 A1 * | 10/2005 | Damera-Venkata ......... 358/3.03 |
| 2006/0017978 A1 | 1/2006 | Minamino |
| 2006/0119895 A1 * | 6/2006 | Takata et al. ............... 358/3.26 |
| 2006/0152764 A1 | 7/2006 | Loce et al. |
| 2006/0290767 A1 | 12/2006 | Tezuka et al. |
| 2007/0040847 A1 * | 2/2007 | Thebault et al. ............. 345/616 |
| 2007/0139674 A1 | 6/2007 | Kawano et al. |
| 2007/0211306 A1 | 9/2007 | Abe |
| 2007/0236745 A1 | 10/2007 | Noguchi et al. |
| 2007/0258103 A1 * | 11/2007 | Muramatsu .................. 358/1.9 |
| 2009/0003723 A1 | 1/2009 | Kokemohr |
| 2009/0027699 A1 | 1/2009 | Nagai |
| 2009/0168109 A1 | 7/2009 | Kishi |
| 2009/0207453 A1 | 8/2009 | Ike et al. |
| 2010/0129004 A1 * | 5/2010 | Ogawa ........................ 382/274 |
| 2012/0269273 A1 | 10/2012 | Nakagami et al. |

FOREIGN PATENT DOCUMENTS

| | | | |
|---|---|---|---|
| JP | 9-074488 A | 3/1997 | |
| JP | 9085993 A1 | 3/1997 | |
| JP | 11-258877 * | 9/1999 | ............ G03G 15/00 |
| JP | 2001-309188 A | 11/2001 | |
| JP | 2002-118748 A | 4/2002 | |
| JP | 2002-271624 A | 9/2002 | |
| JP | 2006-065834 A | 3/2006 | |
| JP | 2006-159452 A | 6/2006 | |

OTHER PUBLICATIONS

Extended European Search Report issued in corresponding European Patent Appln. No. 09173642.1, dated Feb. 2, 2010, which corresponds to related co-pending U.S. Appl. No. 12/604,506.

Kappos, David, Subject Matter Eligibility of Computer Readable Media, Feb. 23, 2010, USPTO 1351 OG 212.

Specification and drawings of unpublished U.S. Appl. No. 12/604,521, filed Oct. 23, 2009 "Image Processing Apparatus and Image Processing Method"; Yuuji Takayama et al. pp. 1-40.

Specification and drawings of unpublished U.S. Appl. No. 12/604,506, filed Oct. 23, 2009 "Image Forming Apparatus and Control Method Thereof"; Go Araki et al. pp. 1-74.

Floyd, Robert et al. "An Adaptive Algorithm for Spatial Grey Scale" Society for Information Display 1975 Symposium Digest of Technical Papers, pp. 36-37. Cited in related co-pending U.S. Appl. No. 12/604,506.

Extended European Search Report in corresponding European Patent Application No. 09173640.5 dated Jun. 25, 2010.

* cited by examiner

| REGION | WIDTH (mm) | SLOPE (mm) |
|---|---|---|
| REGION 1 | L1 | m1 |
| REGION 2 | L2 | m2 |
| REGION 3 | L3 | m3 |

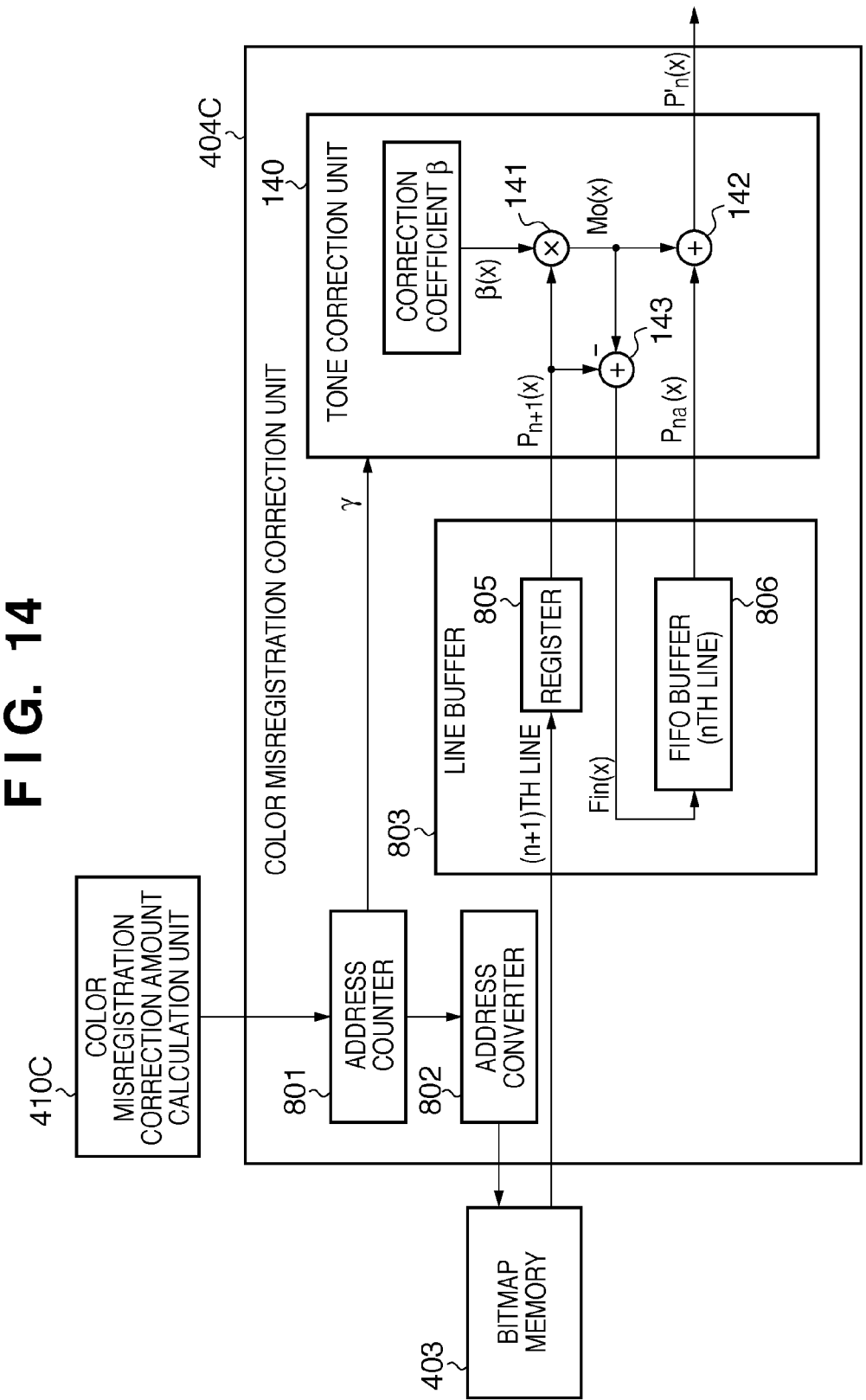

IMAGE FORMING APPARATUS AND CONTROL METHOD THEREOF

BACKGROUND OF THE INVENTION

1. Field of the Invention

The present invention relates to an image forming apparatus and control method thereof and, more particularly, to an image forming apparatus and control method thereof for forming a color image by superimposing images of a plurality of color components using a plurality of image carriers.

2. Description of the Related Art

There has conventionally been known an image forming apparatus which forms a color image by sequentially superimposing a plurality of images of different colors. This color image forming apparatus suffers so-called color misregistration if the image forming position of any color deviates from those of the remaining colors.

As a method for reducing the color misregistration, the image forming position is corrected by performing image processing for image data to convert a readout address in an image memory or the like so as to cancel a positional error generated in exposure scanning (see, for example, Japanese Patent Laid-Open No. 2006-159452).

However, the conventional correction method based on image data readout address conversion causes moiré or jaggies at the edge of a character or line art upon correction. To suppress the generation of moiré or jaggies, the image forming apparatus requires an edge detection unit for detecting an edge, and an exceptional processing unit for applying exceptional processing to the detected edge. This arrangement is disadvantageous in both apparatus size and processing time.

SUMMARY OF THE INVENTION

The present invention has been made to solve the above-described problems, and provides an image forming apparatus and control method thereof for suppressing generation of moiré and generation of jaggies at the edge of a character or line art by a simple arrangement when correcting color misregistration in color image formation.

According to one aspect of the present invention, there is provided an image forming apparatus which includes, for respective printing materials of a plurality of colors, a plurality of color image forming sections each for forming a visible image by exposure scanning and development on an image carrier, and forms a color image by superimposing visible images formed on a print medium by the plurality of color image forming sections, each of the plurality of color image forming sections comprising: exposure shift amount storage unit configured to store shift amount information representing a shift amount between an ideal scanning line and an actual scanning line in an exposure scanning direction on the image carrier; image data storage unit configured to store image data to be formed; address conversion unit configured to convert a readout address in the image data storage unit, based on the shift amount information stored in the exposure shift amount storage unit, and read out image data in accordance with the converted address; tone correction unit configured to perform, based on the address, tone correction for the image data read out by the address conversion unit; multi-level error diffusion unit configured to perform quantization by multi-level error diffusion processing for the image data having undergone the tone correction by the tone correction unit; and exposure control signal generation unit configured to generate an exposure control signal to perform exposure scanning of the image data, based on a quantization level of the quantization by the multi-level error diffusion unit.

According to another aspect of the present invention, there is provided a method of controlling an image forming apparatus which includes, for respective printing materials of a plurality of colors, a plurality of color image forming sections each for forming a visible image by exposure scanning and development on an image carrier, and forms a color image by superimposing visible images formed on a print medium by the plurality of color image forming sections, the method comprising for each of the plurality of color image forming sections: an exposure shift amount acquisition step of acquiring shift amount information representing a shift amount between an ideal scanning line and an actual scanning line in an exposure scanning direction on the image carrier; an image data storage step of storing image data to be formed in an image memory; an address conversion step of converting a readout address in the image memory, based on the shift amount information, and reading out image data in accordance with the converted address; a tone correction step of performing, based on the address, tone correction for the image data read out in the address conversion step; a multi-level error diffusion step of performing quantization by multi-level error diffusion processing for the image data having undergone the tone correction in the tone correction step; and an exposure control signal generation step of generating an exposure control signal based on a quantization level of the quantization in the multi-level error diffusion step.

The present invention can suppress generation of moiré and generation of jaggies at the edge of a character or line art by a simple arrangement when correcting color misregistration in color image formation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a block diagram showing the arrangement of a color misregistration correction unit in the third embodiment.

DESCRIPTION OF THE EMBODIMENTS

Preferred embodiments of the present invention will be described in detail below with reference to the accompanying drawings. Arrangements set forth in the following embodiments are merely examples, and the scope of the invention is not limited to the illustrative arrangements.

First Embodiment

Apparatus Structure

Figure 2:
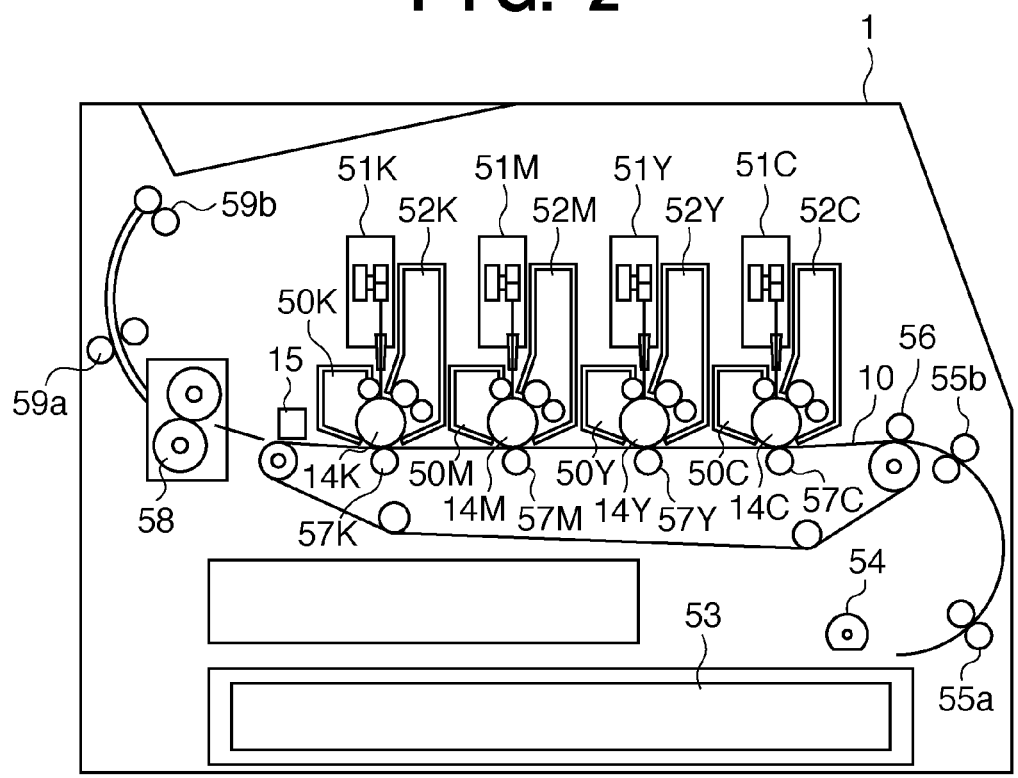
FIG. 2 is a sectional view showing the structure of the image forming apparatus in the embodiment.

FIG. 2 is a sectional view of the structure of an image forming apparatus in the first embodiment. As shown in FIG. 2, the image forming apparatus according to the embodiment has the structure of a 4-drum type color laser beam printer.

In the image forming apparatus, a transfer medium cassette 53 is mounted at the bottom. Print media (for example, print sheets or transparent sheets) set in the transfer medium cassette 53 are picked up one by one by a pickup roller 54, and fed to an image forming section by conveyance roller pairs 55a and 55b. In the image forming section, a transfer conveyance belt 10 for conveying a print medium is kept taut by a plurality of rotating rollers to form a flat surface in a print medium conveyance direction (from right to left in FIG. 2). On the uppermost stream side, a print medium is electrostatically absorbed to the transfer conveyance belt 10. Four photosensitive drums 14C, 14Y, 14M, and 14K are aligned as drum-like image carriers to face the conveyance surface of the belt, forming an image forming section (C, Y, M, and K represent cyan, yellow, magenta, and black color components, respectively).

The image forming section forms images of the respective colors. Arrangements (to be referred to as color image forming sections) for forming an image of each color have the same structure except for the color of a stored printing material (toner). Thus, a C color image forming section for forming an image of the C color component will be explained.

The C color image forming section includes a charger 50C which uniformly charges the surface of the photosensitive drum 14C, a developing unit 52C which stores a C toner and develops an electrostatic latent image formed on the photosensitive drum 14C to make the image visible, and an exposure unit 51C. The developing unit 52C and charger 50C are arranged at a predetermined interval. A laser beam emitted by the exposure unit 51C formed from a laser scanner exposes and scans, via the interval in a direction perpendicular to the sheet surface of FIG. 2, the surface of the photosensitive drum 14C uniformly charged by the charger 50C. The exposed/scanned portion is charged differently from an unexposed portion, forming an electrostatic latent image. The developing unit 52C applies toner to the electrostatic latent image to visualize it (develop it as a toner image), forming a visible image.

A transfer unit 57C is arranged below the conveyance surface of the transfer conveyance belt 10. The toner image formed (developed) on the outer surface of the photosensitive drum 14C is absorbed by charges to a conveyed print medium by a transfer field generated by the transfer unit 57C, thereby transferring the toner image onto the print medium.

The remaining Y, M, and K color image forming sections also execute the same processing as that for the C color component. As a result, C, M, Y, and K toner images are sequentially transferred onto the print medium to overlap each other. After that, a fixing unit 58 thermally fuses and fixes the respective color toners superimposed on the print medium. Discharge roller pairs 59a and 59b discharge the print medium from the apparatus.

In this example, toner images of the respective color components are directly transferred onto a print medium. However, an image forming apparatus applicable to the present invention is not limited to this arrangement. For example, it is possible that toner images of the respective color components are temporarily transferred onto the transfer conveyance belt and then the toner images transferred on the transfer conveyance belt are transferred to a print medium (secondary transfer). The transfer belt used to perform secondary transfer is called an intermediate transfer belt.

Outline of Color Misregistration

Figures 3, 4:
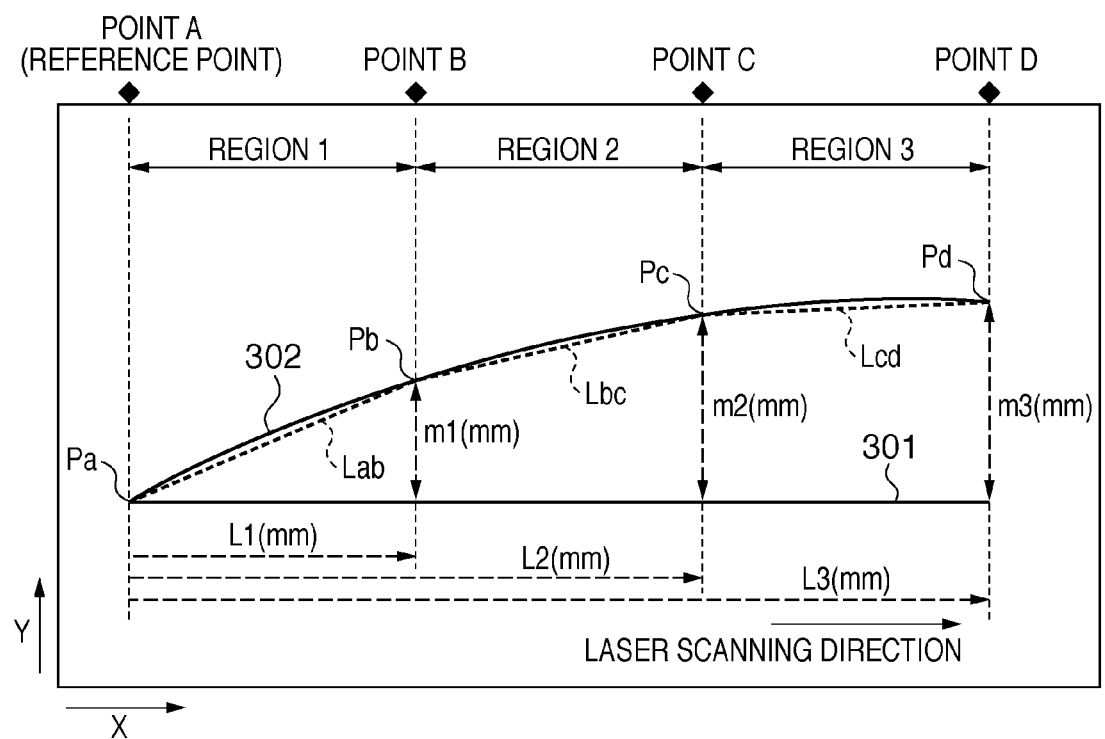
FIG. 3 is a graph for explaining a shift of a main scanning line on a photosensitive drum in the embodiment.
FIG. 4 is a table exemplifying information held in a color misregistration amount storage unit in the embodiment.

FIG. 3 is a graph for explaining a "shift" of a main scanning line in the exposure scanning direction of the photosensitive drum 14C (which may be any one of the photosensitive drums 14M, 14Y, and 14K, and will be called the photosensitive drum 14) serving as an image carrier. In FIG. 3, the horizontal direction (x direction) is a laser beam scanning direction, and the vertical direction (y direction) is the rotational direction of the photosensitive drum 14 (also the print medium conveyance direction).

In FIG. 3, a straight line 301 indicates an ideal main scanning line (to be referred to as a main scanning line 301). A curve 302 exemplifies an actual main scanning line (to be referred to as a main scanning line 302) suffering an upward inclination to the right and a curvature arising from a positional or diameter error of the photosensitive drum 14 and a positional error of the optical system of the exposure unit 51 for each color. The inclination and curvature of the main scanning line generated in a color image forming section of any color results in color misregistration upon transferring toner images of a plurality of colors at once on a transfer medium.

The first embodiment suppresses the generation of color misregistration by the following method. First, in the main scanning direction (X direction) serving as the exposure scanning direction, the shift amount between the ideal main scanning line 301 and the actual main scanning line 302 in the subscanning direction is measured at a plurality of points (points B, C, and D) using the scan start position of the print region as a reference point (point A). Then, the print region is divided into a plurality of regions (region 1 between Pa and Pb, region 2 between Pb and Pc, and region 3 between Pc and Pd) at these points. Straight lines Lab, Lbc, and Lcd connecting the respective points approximate inclinations of the main scanning line in the respective regions. When the difference (m1 in region 1, m2-m1 in region 2, or m3-m2 in region 3) in shift amount between the points is positive, the main scanning line in the target region has an upward inclination to the right. When the difference is negative, the main scanning line in the target region has a downward inclination to the right.

In FIG. 3, the number of divided regions is three for descriptive convenience, but the number of regions is not limited to this example.

Overall Arrangement of Color Misregistration Correction

Figure 1:
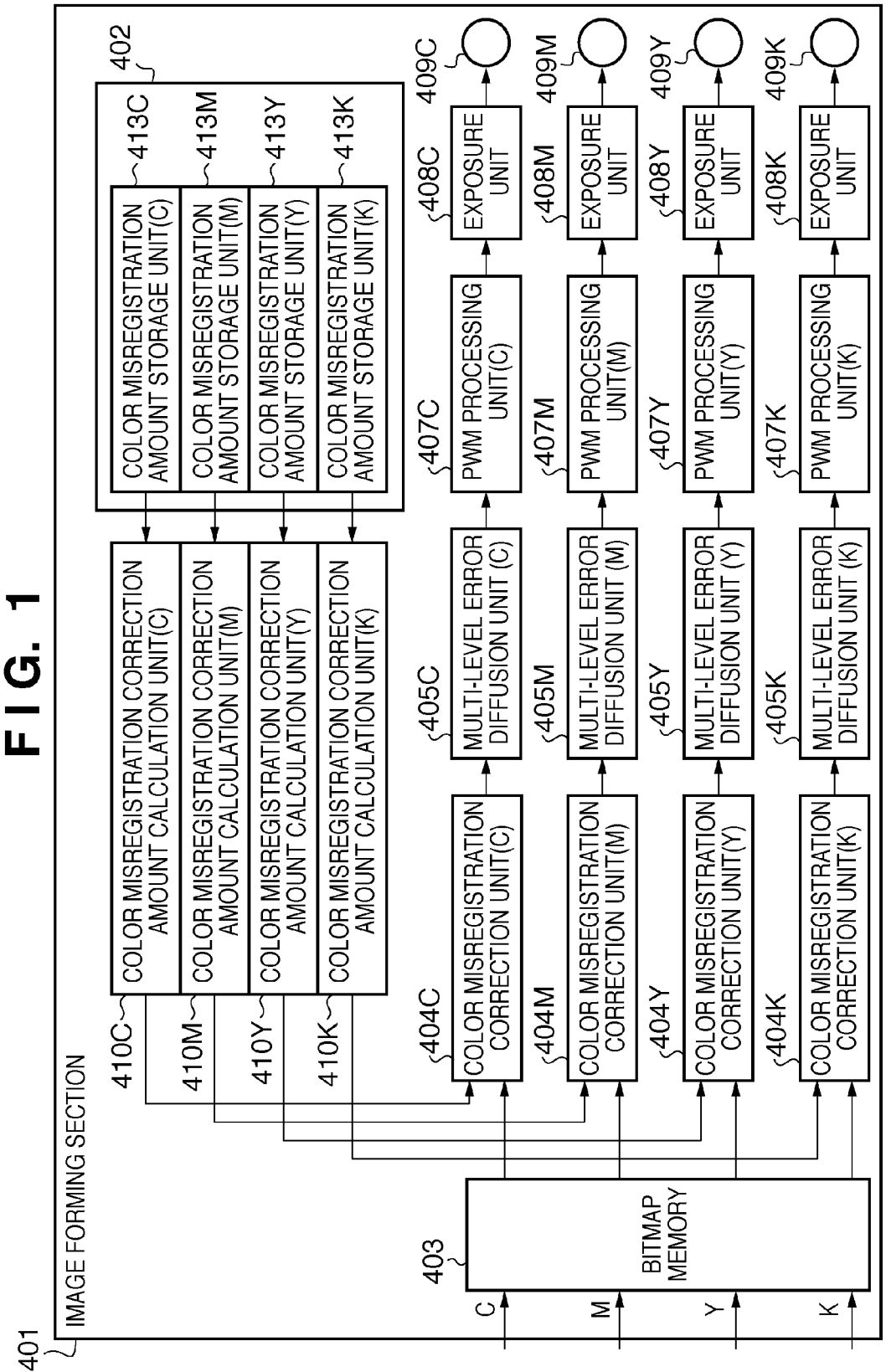
FIG. 1 is a block diagram showing the arrangement of an image forming apparatus according to an embodiment of the present invention.

FIG. 1 is a block diagram exemplifying the arrangement of an image forming section for correcting color misregistration arising from the inclination or curvature of the scanning line in the first embodiment.

In FIG. 1, an image forming section 401 receives raster image data of 8 bits for each of C, M, Y, and K from an external apparatus (for example, a computer or controller: not shown). The image forming section 401 temporarily stores the raster image data in a bitmap memory 403 serving as an image data storage unit. Then, the image forming section 401 performs actual print processing to form bitmap information stored in the bitmap memory 403. The bitmap memory 403 is an image memory for temporarily storing raster image data to be formed, and thus includes a page memory capable of storing image data of one page. The arrangement of the bitmap memory 403 is not limited to the page memory, and may be a band memory for storing data of a plurality of lines. For descriptive convenience, the bitmap memory 403 is assumed to have a capacity capable of storing CMYK bitmap data of one page. Needless to say, the bitmap memory 403 may hold C, M, Y, and K pages at once, like this example, but may also include a memory for, for example, each color image forming section.

Color misregistration amount storage units 413C, 413M, 413Y, and 413K for the respective colors hold written misregistration amount information of the respective colors in the manufacture of the apparatus. The color misregistration amount storage unit is formed from, for example, a writable nonvolatile memory such as an EEPROM. The held color misregistration amount information requires a very small capacity, so one memory element may store the color misregistration amounts of all the color components. In FIG. 1, one memory element is assumed to store the color misregistration amounts of all the color components, and will be called a color misregistration amount storage unit 402.

The color misregistration amount storage unit 402 in the first embodiment stores information on the inclination and curvature of a main scanning line as color misregistration amount information. The inclination and curvature indicate shift amounts in the subscanning direction between the actual main scanning line 302 and the ideal main scanning line 301 that are measured at a plurality of points, as described with reference to FIG. 3. FIG. 4 exemplifies the information stored in the color misregistration amount storage unit 402. In FIG. 4, L1 to L3 and m1 to m3 have the same meanings as those of the same reference symbols in FIG. 3. Note that information stored for each color changes depending on the individual apparatus.

In the first embodiment, the color misregistration amount storage unit 402 stores the shift amount between an ideal main scanning line and an actual main scanning line. However, information actually stored is not limited to this example as long as it can identify the inclination and curvature of an actual main scanning line. In this example, information in the color misregistration amount storage unit 402 is stored in advance as apparatus-specific information obtained by measuring the shift amount during the manufacture. However, the shift amount held in advance in the present invention can also be acquired by another method. For example, the image forming apparatus itself may include a detection mechanism for detecting the shift amount. In this case, a predetermined pattern for measuring a shift amount is formed for an image carrier of each color. A shift amount detected by the detection mechanism is stored.

The image forming section 401 executes print processing after correcting image data of each color component to cancel the shift amount of the main scanning line stored in the color misregistration amount storage unit 402.

Color misregistration correction amount calculation units 410C, 410M, 410Y, and 410K calculate color misregistration correction amounts in the subscanning direction in accordance with the address in the main scanning direction, based on items of shift amount information of the main scanning line for the respective colors that are stored in the color misregistration amount storage unit 402. The color misregistration correction amount calculation units 410C, 410M, 410Y, and 410K output the calculation results to corresponding color misregistration correction units 404C, 404M, 404Y, and 404K for the respective colors to set the results in them.

Letting x (dots) be an address in the main scanning direction and y (dots) be a color misregistration amount in the subscanning direction, the color misregistration amount y in each region in FIG. 3 is given by $$\text{region } 1: y=(m1/L1)*x$$

$$\text{region } 2: y=((m2-m1)/(L2-L1))\times(x-L1)+m1$$

$$\text{region } 3: y=((m3-m2)/(L3-L2))*(x-L2)+m2 \quad (1)$$

where L1, L2, and L3 are distances (mm) in the main scanning direction from the print start position to the right ends of regions 1, 2, and 3, and m1, m2, and m3 are shift amounts between the ideal main scanning line 301 and the actual main scanning line 302 at the right ends of regions 1, 2, and 3. Note that the print resolution in the first embodiment is assumed to be 600 dpi.

Color Misregistration Correction Unit

The color misregistration correction units 404C, 404M, 404Y, and 404K correct color misregistration represented by equation (1) that is caused by the inclination and curvature of the main scanning line. More specifically, the color misregistration correction units 404C, 404M, 404Y, and 404K adjust the output timing of bitmap data stored in the bitmap memory 403 and adjust the tone of each pixel, based on color misregistration correction amounts calculated for each dot by the color misregistration correction amount calculation units 410C, 410M, 410Y, and 410K. The color misregistration correction units 404C, 404M, 404Y, and 404K have the same arrangement with different correction amounts. Hence, the operation of the color misregistration correction unit 404C for the C component will be explained in detail.

Figure 7:
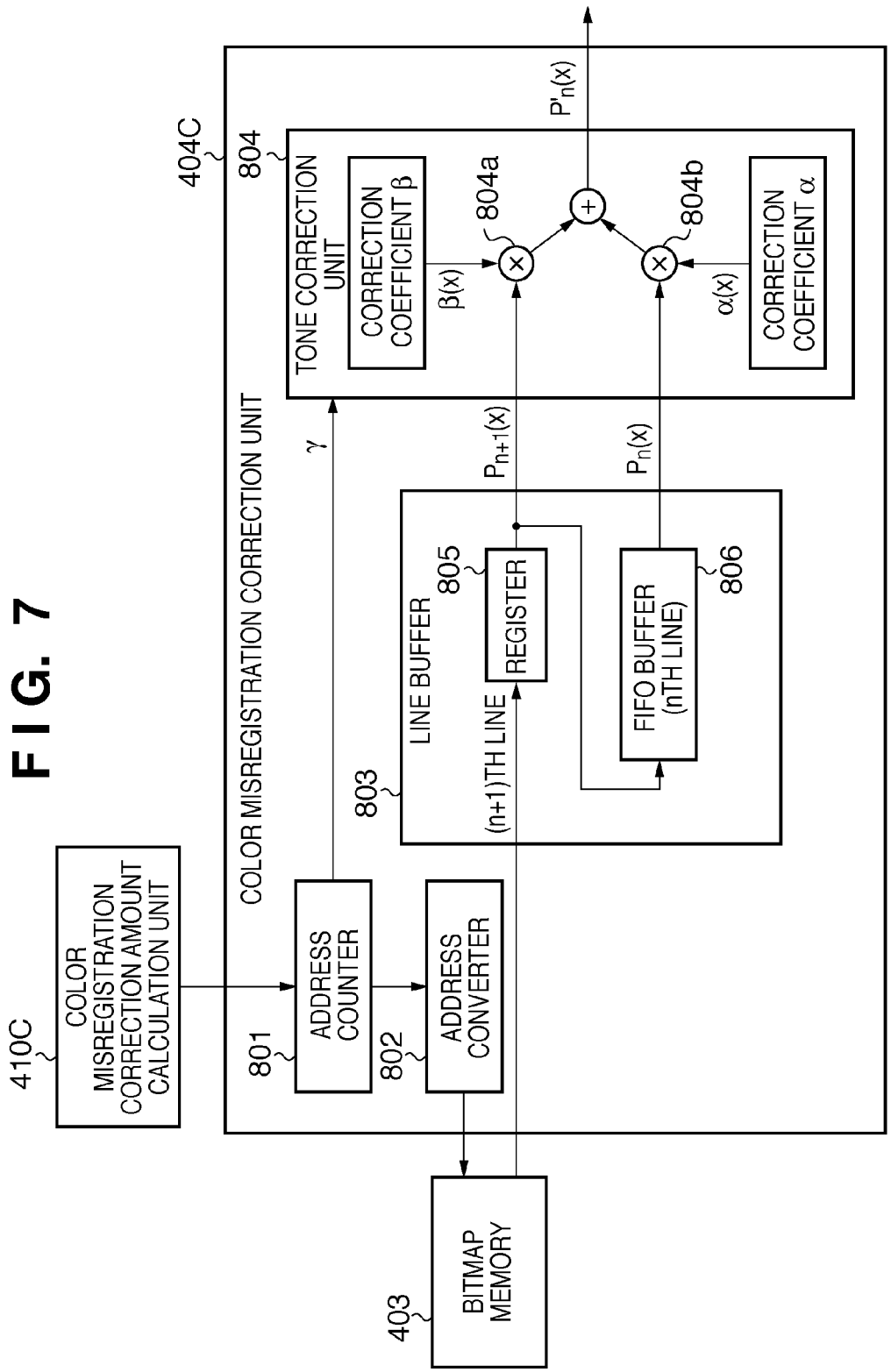
FIG. 7 is a block diagram showing the arrangement of a color misregistration correction unit in the embodiment.

FIG. 7 is a block diagram showing the detailed arrangement of the color misregistration correction unit 404C. As shown in FIG. 7, the color misregistration correction unit 404C includes an address counter 801, address converter 802, line buffer 803, and tone correction unit 804.

According to equation (1) described above, the address counter 801 outputs, to the address converter 802, information necessary to generate addresses in the main scanning direction and subscanning direction to perform color misregistration correction processing. Also, the address counter 801 outputs, to the tone correction unit 804, information representing the degree of shift (value of the decimal part to be described later) in the subscanning direction.

The address converter 802 performs readout access to the bitmap memory 403 using address data (X address) in the main scanning direction and address data (Y address) in the subscanning direction from the address counter 801. Data (C component data in this case) read out from the bitmap memory 403 is output to the line buffer 803.

As shown in FIG. 7, the line buffer 803 includes a register 805, and a FIFO buffer 806 having a 1-line storage area. The line buffer 803 outputs C component data $P_{n+1}(x)$ and $P_n(x)$ of two pixels adjacent in the subscanning direction to the tone correction unit 804. The tone correction unit 804 executes tone correction to be described later.

Figure 8:
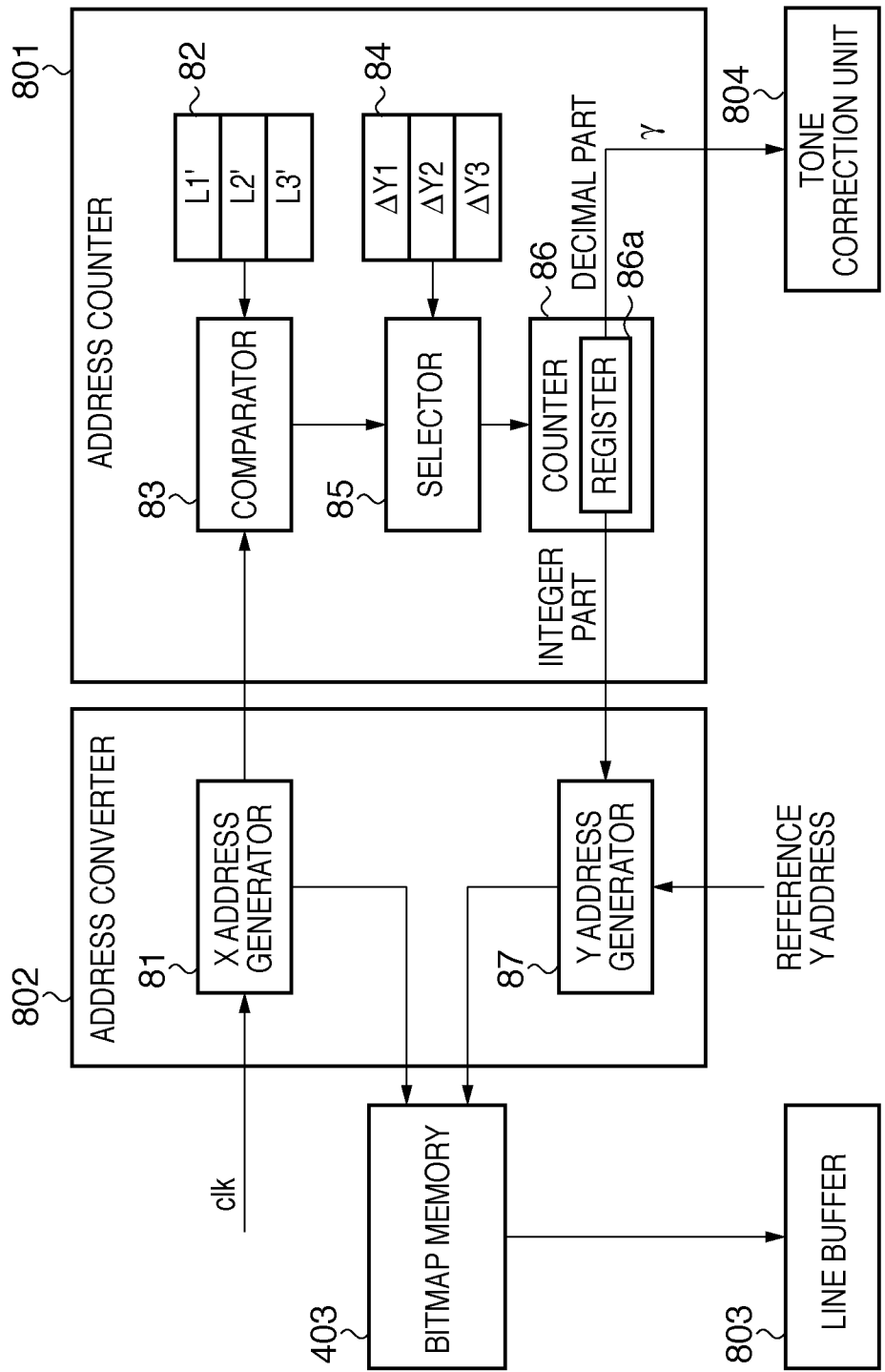
FIG. 8 is a block diagram showing the detailed arrangements of an address counter and address converter in the color misregistration correction unit in the embodiment.

Processes performed by the address counter 801 and address converter 802 will be described in detail with reference to FIG. 8. Assume that the color misregistration correction amount calculation unit 410C calculates pixel positions L1', L2', and L3' in the horizontal direction (ideal scanning direction), based on distances L1, L2, and L3 (mm) stored in the color misregistration amount storage unit 402.

The color misregistration correction amount calculation unit 410C calculates the inclination of a straight line connecting the shift amounts of respective regions. The inclination is calculated for each pixel. Letting $\Delta y$ be the inclination of each pixel, the inclinations of the respective regions in the information example shown in FIG. 4 are given by region 1: $\Delta y1 = m1/L1'$ region 2: $\Delta y2 = (m2-m1)/(L2'-L1')$ region 3: $\Delta y3 = (m3-m2)/(L3'-L2')$ A register 82 shown in FIG. 8 stores L1', L2', and L3', and a register 84 stores $\Delta y1$, $\Delta y2$, and $\Delta y3$. Note that $\Delta y1$, $\Delta y2$, and $\Delta y3$ have positive/negative signs.

An X address generator 81 in the address converter 802 is reset when creating correction data for one scan of a laser beam. The X address generator 81 adds a pixel clock clk to generate a horizontal readout address (X address) in the bitmap memory 403. Every time the pixel clock clk is input, the X address is incremented from 0 to 1, 2, . . . .

A comparator 83 in the address counter 801 compares an X address value from the X address generator 81 and L1', L2', and L3' values held in the register 82 to determine which of regions 1 to 3 shown in FIG. 3 contains the current X address. An output signal representing the determination result is a 2-bit signal because it suffices to identify three states.

A selector 85 selects and outputs one of the inclinations $\Delta y1$, $\Delta y2$, and $\Delta y3$ stored in the register 84 in accordance with a signal output from the comparator 83. More specifically, when the current X address falls within the range ($X \leq L1'$) of region 1, the selector 85 selects and outputs $\Delta y1$. When the current X address falls within the range ($L1' < X \leq L2'$) of region 2, the selector 85 selects and outputs $\Delta y2$. When the current X address falls within the range ($L2' < X$) of region 3, the selector 85 selects and outputs $\Delta y3$.

A counter 86 is reset prior to one scanning. A register 86a in the counter 86 accumulates the inclination $\Delta y$ output from the selector 85, and holds the value. Since the inclination $\Delta y$ contains a decimal part, the register 86a also has a corresponding number of bits. The counter 86 outputs the integer part of the accumulation result held in the register 86a to a Y address generator 87 of the address converter 802, and the decimal part to the tone correction unit 804.

Prior to one scanning, a predetermined reference Y address in the bitmap memory 403 is set in the Y address generator 87 in the address converter 802. The Y address generator 87 adds an integer value from the counter 86 to the reference Y address. The sum serves as a readout Y address in the bitmap memory 403.

In this manner, X and Y addresses according to equation (1) are generated as integer values. By using the X and Y addresses as readout addresses, C component data at a corresponding position in the bitmap memory 403 is read out and stored in the line buffer 803.

A feature of reading pixel data based on X and Y addresses in the first embodiment will be explained. For example, the reference Y address is 100 to generate data for the 100th scanning. A value stored in the register 86a of the counter 86 is assumed to be 100.1. At this time, it is ideal to read pixel data at a position corresponding to a Y address "100.1" in the bitmap memory 403. However, the pixel position in the bitmap memory 403 is represented by an integer, so the Y address "100.1" does not exist.

The first embodiment, therefore, handles the Y address "100.1" as follows. The Y address "100.1" exists between Y addresses "100" and "101". The pixel value at the address "100" has a 90% influences on the pixel value to be obtained (tone-corrected pixel value), and the pixel value at the address "101" has a 10% influence. Considering this, the first embodiment executes tone correction for a nonexistent Y address containing the decimal part by decimal part-dependent weighted interpolation for pixel values sandwiching the Y address. As a result, a pixel value corresponding to the Y address is attained.

The tone correction unit 804 in FIG. 7 performs this tone correction. Although the reference Y address is incremented by with each scan, the color misregistration correction amount, that is, the offset amount with respect to the reference Y address remains unchanged. Every time the address in the main scanning direction does not change, a decimal part output from the address counter 801 (counter 86) also remains unchanged. In the first embodiment, therefore, a line position of interest in the address counter 801 may differ from a line position where a pixel of interest to undergo tone interpolation exists. The tone correction unit 804 can execute tone correction using the value of the decimal part input from the address counter 801.

The tone correction unit 804 receives a value $\gamma$ of the decimal part output from the counter 86, and calculates, based on $\gamma$, weighted correction coefficients $\alpha$ and $\beta$ to be multiplied by multipliers 804a and 804b. An adder adds the products of two lines by the correction coefficients $\alpha$ and $\beta$, outputting tone-corrected data. More specifically, the tone correction unit 804 solves a weighted interpolation equation:

$$P'_n(x) = P_{n+1}(x)*\beta + P_n(x)*\alpha$$

This equation is generalized. Letting $Cx,y+1$ be the pixel value of the C component obtained from the register 805, and $Cx,y$ be the pixel value of the C component obtained from the FIFO buffer 806, a tone-corrected pixel value $Hx,y$ is calculated by $$Hx,y = Cx,y+1*\beta + Cx,y*\alpha \qquad (2)$$

The weighted correction coefficients $\alpha$ and $\beta$ in equation (2) have the following relations with reference to the value $\gamma$ of the decimal part output from the counter 86:

$\beta = 1 - \gamma$ $\alpha = \gamma$

As described above, to calculate a pixel value corresponding to a nonexistent Y address containing the decimal part, tone correction processing in the first embodiment refers to pixel data of two lines sandwiching the Y address. Assume that P is an X address generated by the address converter 802, Q is the reference address of a Y address, and the offset of the Y address is 0.1. In this case, the register 805 in the line buffer 803 receives data at the address (P,Q) in the bitmap memory

403. The pixel position referred to in correction processing is (P,Q+1). For a pixel position of interest in the register 805, data at the address (P,Q+1) has not been read yet. The first embodiment solves this problem by using data output from the FIFO buffer 806 as C component data at the pixel (P,Q) of interest and data output from the register 805 as (P,Q+1), as shown in FIG. 7.

Color Misregistration Processing (Details)

Figure 5:
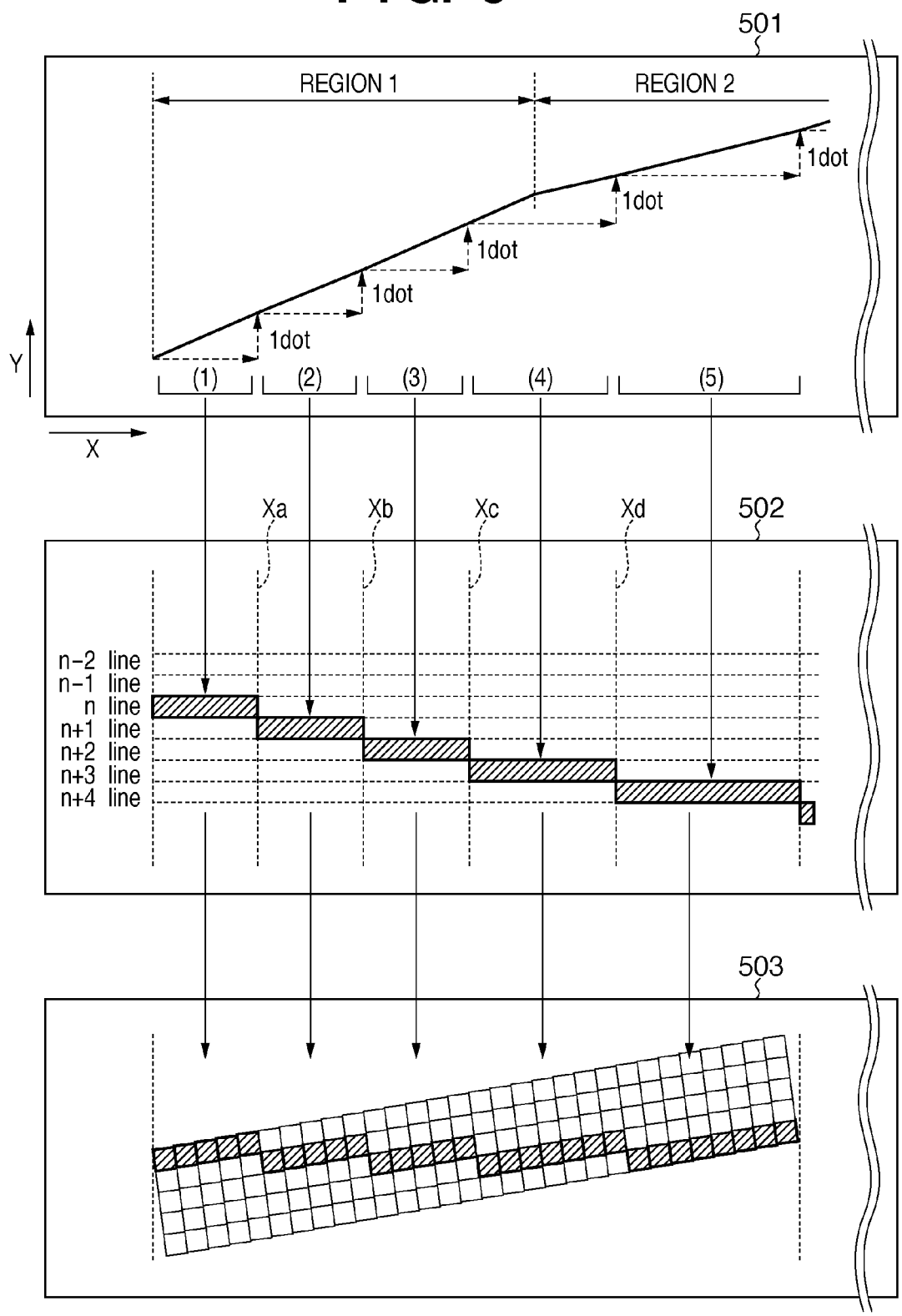
FIG. 5 is a view for explaining a correction operation to a color misregistration correction amount corresponding to the integer part in an address converter in the embodiment.

The arrangement and operation of the color misregistration correction unit 404C in the first embodiment have been described, and will be explained in more detail with reference to FIG. 5. In FIG. 5, a graph 501 shows a color misregistration curve plotted based on information stored in the color misregistration amount storage unit 402. The inclination of this curve is Δy1 in region 1 and Δy2 in region 2. Image data 502 is generated after address conversion by the address converter 802 in the first embodiment. An exposure image 503 is obtained by exposing the image carrier based on image data after color misregistration correction for each pixel by the color misregistration correction unit 404C. The exposure image 503 reveals that generated color misregistration is roughly corrected. As represented by the image data 502, a positive subscanning direction in the bitmap memory 403 is downward in FIG. 5.

As is apparent from FIG. 5, the address converter 802 sequentially accumulates Δy1 while the X address is updated. However, no carry to an integer digit occurs before an address Xa, so the Y address stays on the nth line. When the X address reaches Xa, a carry to an integer digit occurs, and the Y address is updated to indicate the (n+1)th line. In FIG. 5, an integer carry occurs when the X address reaches Xb, Xc, Xd . . . . Note that the cycle in which a carry occurs differs between regions 1 and 2 because the inclination is different between them.

Figure 6:
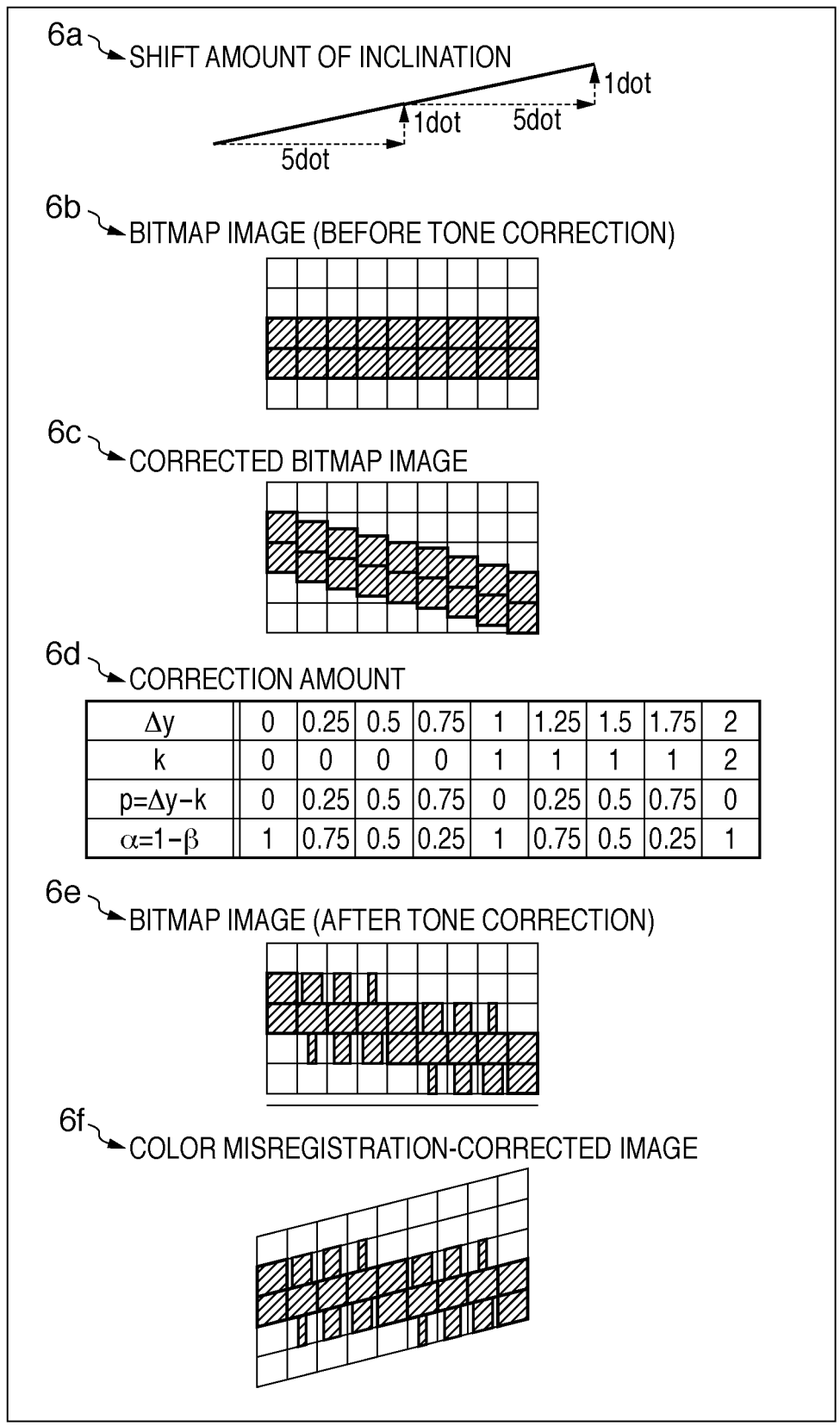
FIG. 6 is a view showing a correction operation on a color misregistration correction amount corresponding to the decimal part in a tone correction unit in the embodiment.

Color misregistration correction for smaller than one pixel, that is, correction processing for a misregistration amount corresponding to the decimal part of the color misregistration correction inclination Δy by the tone correction unit 804 in the first embodiment will be described in detail with reference to FIG. 6.

A misregistration amount corresponding to the decimal part is corrected by adjusting the tone ratio of dots adjacent in the subscanning direction. 6a exemplifies a main scanning line having an upward inclination to the right. 6b represents the bitmap image of a horizontal straight line before tone correction. 6c represents a corrected bitmap image to cancel color misregistration arising from the inclination of the main scanning line. To generate a corrected bitmap represented in 6c, dots adjacent in the subscanning direction undergo tone correction. A table 6d represents the relationship between the color misregistration correction inclination Δy and the correction coefficient for tone correction. In this table, a value k is the integer part (decimal part is rounded down) of the color misregistration correction amount Δy, and represents a correction amount in the subscanning direction for each pixel. β and α are weighting coefficients to perform correction for smaller than one pixel in the subscanning direction, and have the relationship given by equation (2). More specifically, α represents a distribution factor to a preceding dot (data from the register 805 in FIG. 7), and β represents a distribution factor to a dot of interest (data from the FIFO buffer 806 in FIG. 7).

6e represents a bitmap image obtained upon performing tone correction for dots adjacent in the subscanning direction in accordance with the correction coefficients α and β shown in 6d. 6e shows a bitmap image after color misregistration correction in the first embodiment. 6f represents the formed image of the straight line upon canceling the misregistration amount of the inclination in 6a.

The color misregistration correction processing by the color misregistration correction unit 404C has been described. The color misregistration correction units 404M, 404Y, and 404K for the remaining color components M, Y, and K also perform the same color misregistration correction. By executing color misregistration correction for each pixel in each print color, color misregistration between the print colors can be set to be smaller than one pixel.

Multi-level Error Diffusion Processing

As described above, the color misregistration correction unit 404C performs tone correction based on adjacent pixels in order to cope with the decimal part of the Y address. A pixel value obtained after the tone correction contains the value of the decimal part. As a feature of the first embodiment, the value of the decimal part of a pixel value after tone correction undergoes multi-level error diffusion processing as halftone processing to save the value. The multi-level error diffusion processing will be exemplified.

Assuming that pixel values read from the bitmap memory 403 are Cx,y=0 and Cx,y+1=255, and the correction coefficients are β=0.1 and α=0.9, the tone-corrected pixel value Hx,y is calculated according to equation (2):

$$Hx, y = Cx, y+1 * \beta + Cx, y * \alpha \quad (4)$$
$$= 255 \times 0.1 + 0 \times 0.9$$
$$= 25.5$$

A tone-corrected pixel value Hx,y+1 in next scanning upon incrementing the reference Y address by one is calculated. When a pixel value read from the bitmap memory 403 is Cx,y+2=0, Hx,y+1 is calculated according to equation (2):

$$Hx, y+1 = Cx, y+2 * \beta + Cx, y+1 * \alpha \quad (5)$$
$$= 0 \times 0.1 + 255 \times 0.9$$
$$= 229.5$$

In this case, the X address remains unchanged from one in previous scanning, so the correction coefficients β and α are β=0.9 and α=0.1, similar to previous scanning.

As is apparent from equations (4) and (5), the tone-corrected pixel values Hx,y and Hx,y+1 contain values of the decimal part. A normal pixel value can take only an integer value. If a tone-corrected pixel value is rounded to an integer, no density is saved before and after tone correction. As a result of rounding in this example, a pixel value "255" is calculated into 26 according to equation (4) and 230 according to equation (5). The sum of 26 and 230 is 256, which is different from the original value "255".

To prevent this, the first embodiment saves the density by executing the following multi-level error diffusion processing while keeping the value of the decimal part of a tone-corrected pixel value.

Multi-level error diffusion units 405C, 405M, 405Y, and 405K perform halftone processing based on multi-level error diffusion for image data which are output from the color misregistration correction units 404C, 404M, 404Y, and 404K after color misregistration correction and tone correction. Then, the multi-level error diffusion units 405C, 405M, 405Y, and 405K determine the quantization levels of respective pixel values.

As described above, tone-corrected data has a pixel value of the decimal part. Also in multi-level error diffusion processing, calculation is done using bits enough to handle the value of the decimal part. Consequently, the pixel value of the decimal part is diffused as a quantization error to peripheral pixels, saving the density of the tone-corrected data. Since the arrangement of multi-level error diffusion processing is also the same between the respective colors, processing to the C component will be described.

Figure 9:
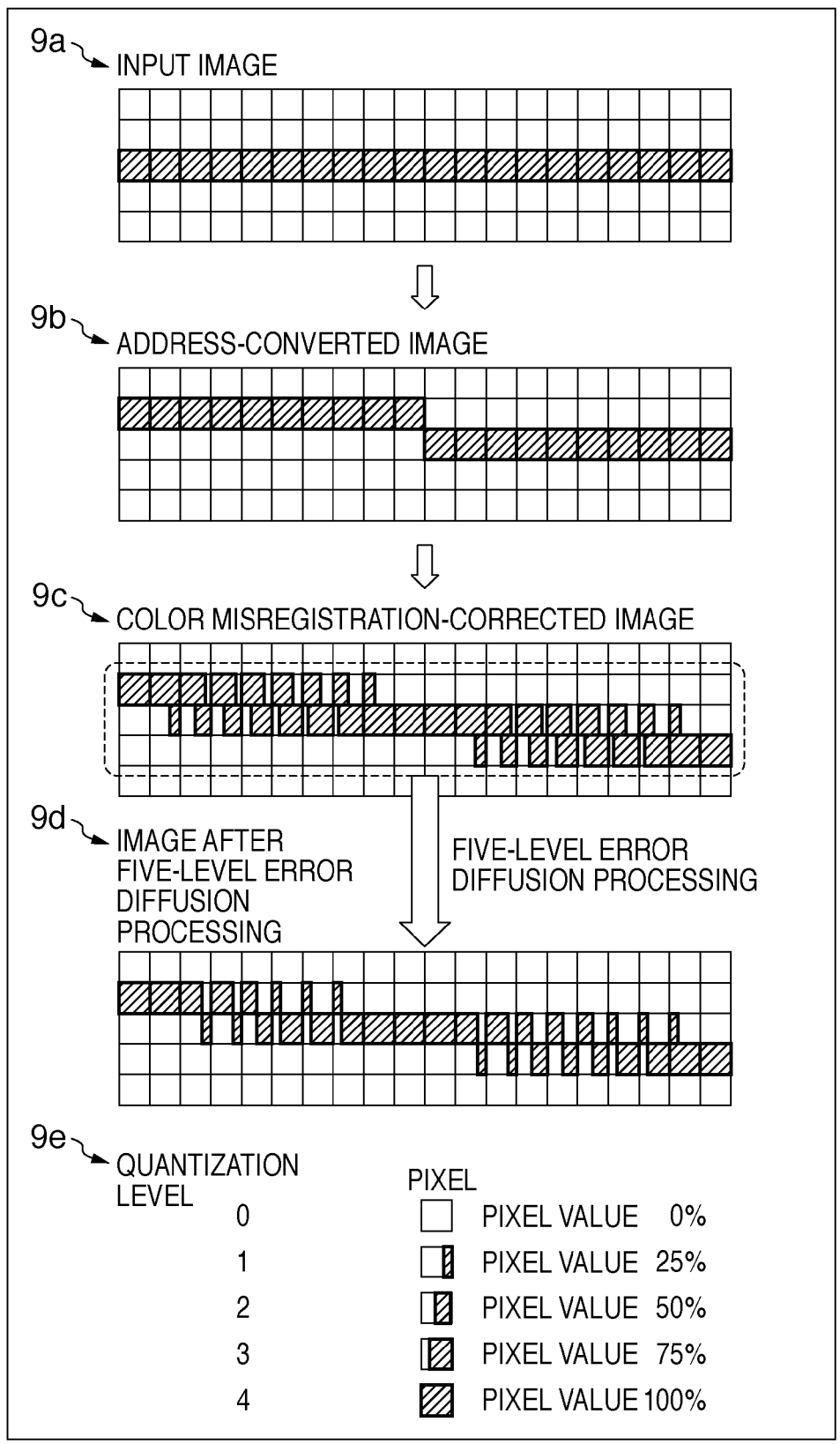
FIG. 9 is a view showing a concrete example of performing five-level error diffusion processing in the embodiment after color misregistration correction processing.

Five-level error diffusion processing executed for a thin line image after color misregistration correction processing will be exemplified with reference to FIG. 9. The address converter 802 performs address conversion for an input thin line image as shown in 9a, obtaining an image shown in 9b. The address-converted image further undergoes color misregistration correction, obtaining an image shown in 9c. The color misregistration-corrected image undergoes five-level error diffusion processing, obtaining an image shown in 9d. 9e represents the correspondence between each pixel value in the error-diffused image and the quantization level.

In general, the number of tone levels of one dot representable by a printer is smaller than that of one pixel in image data, and halftone needs to be expressed using halftone processing. To appropriately achieve color misregistration correction, a toner image is desirably developed based on a color misregistration-corrected image in 9c of FIG. 9. In halftone processing after color misregistration correction, the state of the color misregistration-corrected image can be held as much as possible.

In the image after five-level error diffusion in 9d, pixel values in five stages are applied to five quantization levels 0 to 4 obtained by error diffusion, as shown in 9e. The image after five-level error diffusion in 9d reveals that halftone processing is done to hold the state of the color misregistration-corrected image shown in 9c.

Figure 10:
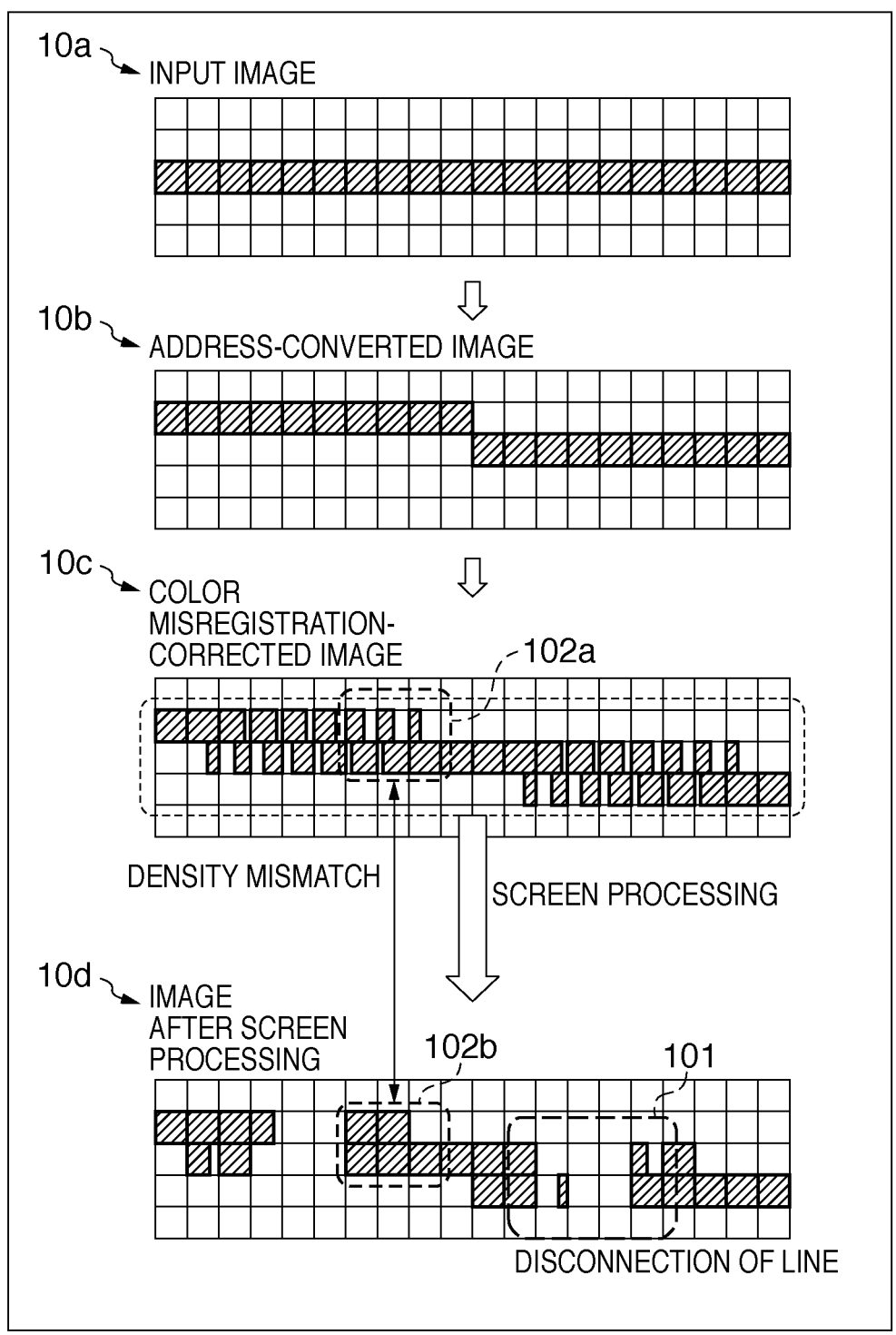
FIG. 10 is a view showing a concrete example of performing general screen processing after color misregistration correction processing.

For comparison with the first embodiment, screen processing will be exemplified with reference to FIG. 10. The screen processing is halftone processing generally used in an electrophotographic color image forming apparatus. 10a to 10c in FIG. 10 exemplify an input thin line image, an image having undergone address conversion, and an image having undergone color misregistration correction, similar to 9a to 9c in FIG. 9. The color misregistration-corrected image undergoes error diffusion processing by screen processing, obtaining an image shown in 10d of FIG. 10.

General screen processing causes disconnection of a line as represented by 101 in 10d, and a density mismatch before and after screen processing as represented by 102a and 102b in 10c and 10d. It becomes difficult to hold the state of a color misregistration-corrected image. The disconnection of a thin line results in jaggies at the edge of a character or line art. The disconnection of a thin line and a change of the density differ between colors or color misregistration amounts. The difference generates moiré at a secondary color portion where a plurality of colors overlap each other. To solve these problems, it is necessary to detect a thin line and perform special processing for holding the state of a color misregistration-corrected image.

When multi-level error diffusion in the first embodiment is applied as halftone processing after color misregistration correction, the state of a color misregistration-corrected image can be held without any special processing to a thin line. Hence, generation of moiré and generation of jaggies at the edge of a character or line art can be suppressed easily.

The halftone processing by the multi-level error diffusion unit 405C has been described. The multi-level error diffusion units 405M, 405Y, and 405K for the remaining color components M, Y, and K can also execute the same processing.

PWM Processing

PWM (Pulse Width Modulation) processing units 407C, 407M, 407Y, and 407K receive images of the respective color components having undergone the above-described multi-level error diffusion processing. The PWM processing units 407C, 407M, 407Y, and 407K generate PWM signals as exposure control signals for driving exposure units 408C, 408M, 408Y, and 408K. The exposure units 408C, 408M, 408Y, and 408K perform exposure processing to image carriers 409C, 409M, 409Y, and 409K in accordance with the PWM signals. Since the arrangements of PWM processing and exposure processing are also the same between the respective colors, processing to the C component will be described.

An image forming apparatus which performs exposure scanning can control the exposure in accordance with a well-known PWM signal. However, the exposure corresponding to the quantization level and the developed toner density do not have a linear relationship. If an error-diffused image shown in 9d of FIG. 9 is directly converted into a PWM signal to perform exposure, it becomes difficult to hold a color misregistration-corrected image. In the first embodiment, therefore, the PWM processing unit 407C converts a quantization level obtained by multi-level error diffusion processing into a PWM signal complying with the relationship between the exposure and the toner density.

Figure 11:
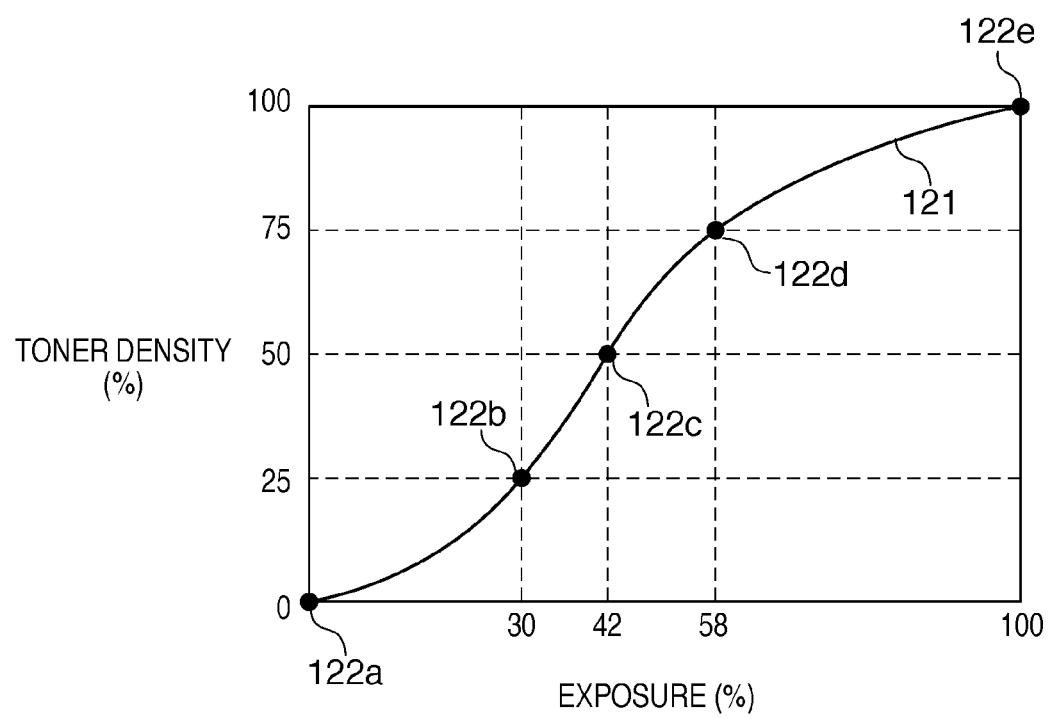
FIG. 11 is a graph showing the characteristic of a PWM signal generated in a PWM processing unit in the embodiment.

FIG. 11 shows the relationship between the exposure and the toner density, and an example of conversion from a quantization level obtained by error diffusion into a PWM signal. In FIG. 11, a curve 121 represents the relationship between the exposure and the toner density. In this case, exposures corresponding to quantization levels 0 to 4 attained by five-level error diffusion are determined at points 122a to 122e on the curve 121. More specifically, quantization levels 0 to 4 correspond to toner densities of 0%, 25%, 50%, 75%, and 100%, respectively. Exposures corresponding to the respective toner densities are determined to be 0%, 30%, 42%, 58%, and 100%. An error-diffused image is converted into a PWM signal, making linear the relationship between the quantization level and the toner density.

By using the PWM signal generated in this way, the exposure unit 408C is controlled to expose the image carrier 409C. The PWM processing unit 407C, exposure unit 408C, and image carrier 409C have been described. These processes can also be done for the remaining color components M, Y, and K.

As described above, according to the first embodiment, an image forming apparatus which forms a color image using a plurality of colors executes color misregistration correction in a linear space before quantization (halftone processing). Further, the image forming apparatus performs quantization by multi-level error diffusion to maintain the state of the corrected image. The first embodiment can suppress generation of moiré and generation of jaggies at the edge of a character or line art by a simple arrangement without requiring special processing to a thin line.

Second Embodiment

The second embodiment according to the present invention will be described. The arrangement of an image forming apparatus in the second embodiment is almost the same as that in the first embodiment. Thus, the same reference numerals as those in the first embodiment denote the same parts, and a description thereof will not be repeated. As a feature of the second embodiment, the number of quantization levels is switched in accordance with the color misregistration amount when performing multi-level error diffusion processing described in the first embodiment.

Figure 12:
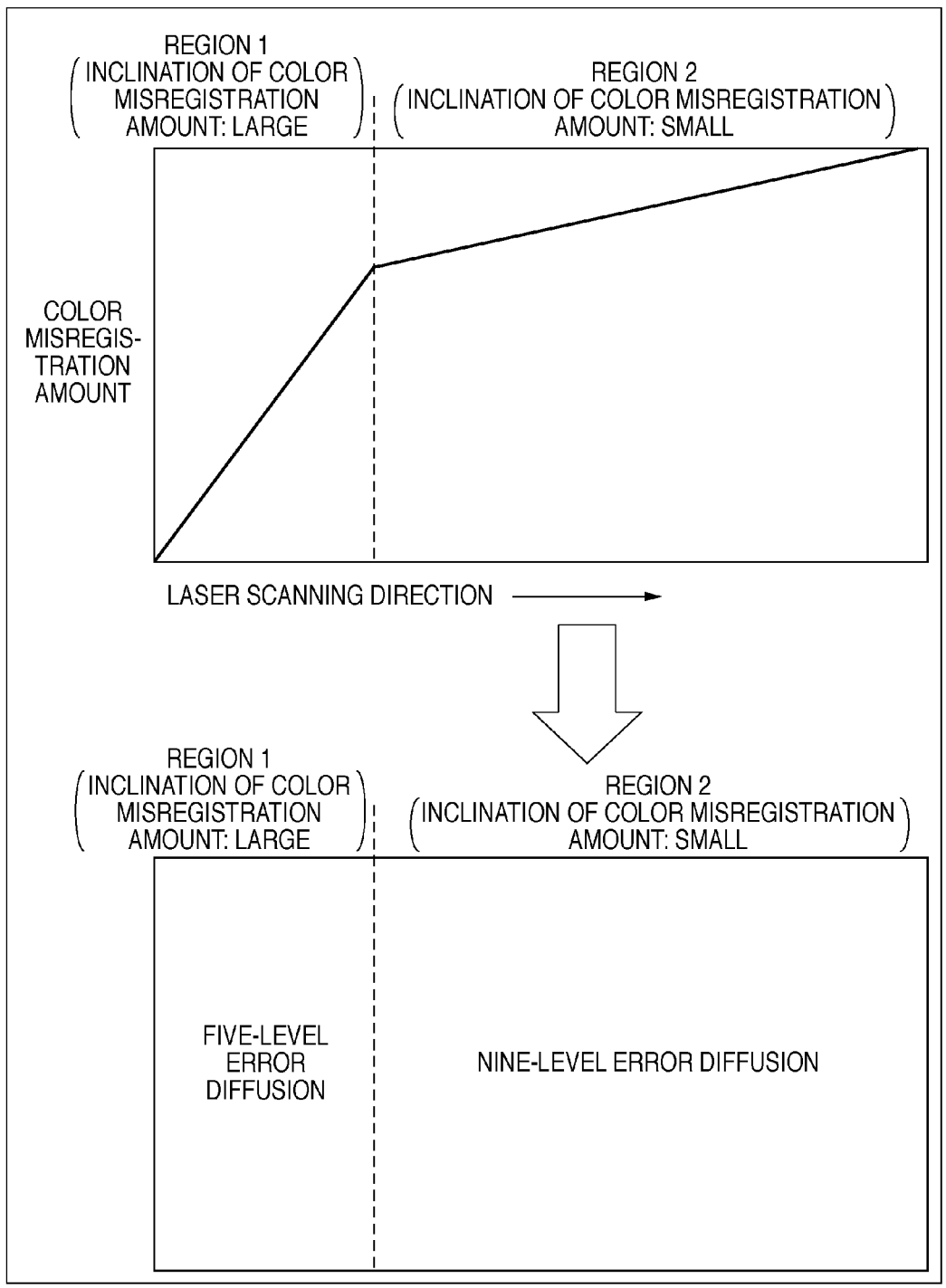
FIG. 12 is a view exemplifying assignment of the number of quantization levels in multi-level error diffusion processing in the second embodiment.

FIG. 12 exemplifies switching of the number of quantization levels in the second embodiment. In FIG. 12, a print region indicated by the laser scanning direction is divided into region 1 having a large inclination of the color misregistration amount and region 2 having a small inclination of the color misregistration amount. In region 2 where the inclination of the color misregistration amount is small, the difference between adjacent color misregistration correction amounts is smaller than that in region 1 where the inclination is large. In other words, the pixel value after tone correction changes finely. To keep the color misregistration correction precision, it is desired to set many possible values (levels) for the PWM signal value for controlling the exposure unit. For this purpose, the number of quantization levels needs to be increased.

The second embodiment switches the number of quantization levels as follows. In region 1 where the inclination of the color misregistration amount is large, five-level error diffusion processing is done. In region 2 where the inclination of the color misregistration amount is small, nine-level error diffusion processing is performed using a larger number of quantization levels.

Figure 13:
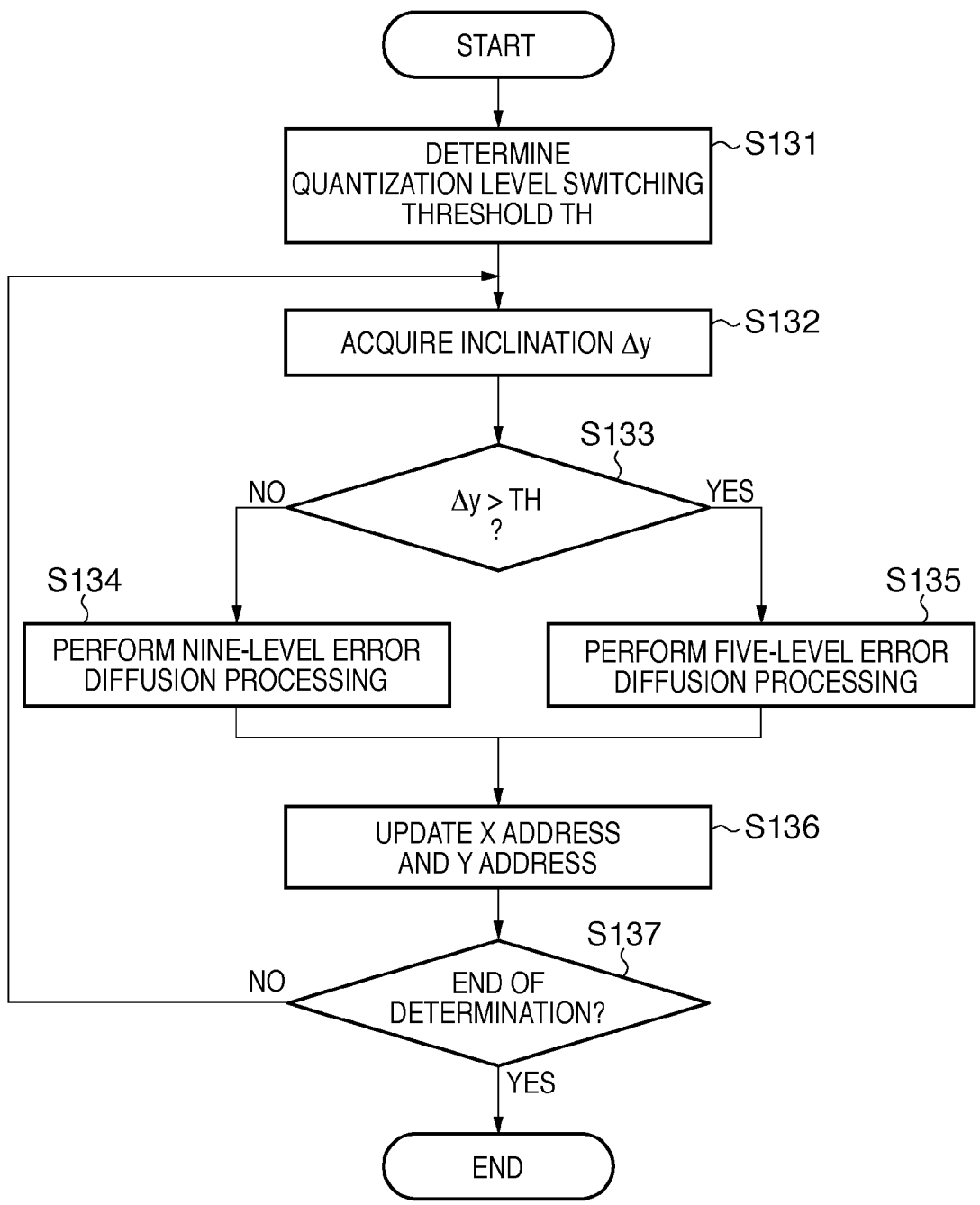
FIG. 13 is a flowchart showing processing to switch the number of quantization levels in multi-level error diffusion processing in the second embodiment.

The processing to switch the number of quantization levels in the second embodiment will be explained with reference to the flowchart of FIG. 13.

In step S131, a threshold TH to switch the number of quantization levels is determined. The threshold TH may be set in advance as a fixed value or switched appropriately in accordance with an image.

In step S132, the inclination Δy of the color misregistration amount output from a selector 85 is acquired from an address counter 801 based on the X address. In step S133, the inclination Δy is compared with the threshold TH.

According to the second embodiment, the number of quantization levels in multi-level error diffusion processing is switched based on the comparison result. For example, a quantization level count switching controller (not shown) in a color misregistration correction unit 404C performs this switching control. More specifically, a quantization level determined by the color misregistration correction unit 404C is sent to a multi-level error diffusion unit 405C. The multi-level error diffusion unit 405C executes error diffusion processing at the designated quantization level.

If the inclination Δy is larger than the threshold TH in step S133, five-level error diffusion processing is executed in step S135. If the inclination Δy is equal to or smaller than the threshold TH, nine-level error diffusion processing is executed in step S134.

After five- or nine-level error diffusion processing, the X address is updated in step S136. At this time, if the X address reaches the end of the target line, the Y address is updated, too.

Finally in step S137, it is determined whether processing of one page has ended. If the processing has not ended, the process returns to step S132 to repeat the series of processes.

As described above, the second embodiment can implement finer color misregistration correction control by switching the number of quantization levels in multi-level error diffusion processing in accordance with the inclination of the color misregistration amount.

Third Embodiment

The third embodiment according to the present invention will be described. The arrangement of an image forming apparatus in the third embodiment is different from that in the first embodiment in only a tone correction unit 804 in a color misregistration correction unit 404C. The same reference numerals as those in the first embodiment denote the same parts, and a description thereof will not be repeated.

In the first embodiment described above, multi-level error diffusion processing is applied to image data containing the value of the decimal part after tone correction. As described above, the multi-level error diffusion processing needs to perform calculation using bits containing the decimal part. This may complicate the multi-level error diffusion processing. To prevent this, the third embodiment saves a pixel value of the decimal part after tone correction without handling the value of the decimal part in multi-level error diffusion processing.

FIG. 14 is a block diagram showing the arrangement of the color misregistration correction unit 404C in the third embodiment. In FIG. 14, the same reference numerals as those in FIG. 7 in the first embodiment denote the same parts, and a description thereof will not be repeated.

In FIG. 14, an address counter 801 performs the same processing as that in the first embodiment. More specifically, the address counter 801 outputs, to an address converter 802, information necessary to generate addresses in the main scanning direction and subscanning direction to perform color misregistration correction processing according to equation (1). Also, the address counter 801 outputs, to the tone correction unit 804, information representing the degree of shift in the subscanning direction.

A multiplier 141 multiplies image data $P_{n+1}(x)$ output from a register 805 by a correction coefficient β. Letting Mo(x) be an integer value obtained by rounding the value of the decimal part, an output from the multiplier 141 is given by $$Mo(x) = Q(P_{n+1}(x) * \beta(x)) = P_{n+1}(x) * \beta(x) + Qe \qquad (6)$$

where Q is a rounding and Qe is a rounding error.

An adder 143 subtracts the integer value Mo(x) output from the multiplier 141 from the image data $P_{n+1}(x)$ from the register 805. The difference serves as an input value Fin(x) to be stored in a FIFO buffer 806. The input value Fin(x) is given by $$\begin{aligned} Fin(x) &= P_{n+1}(x) - Mo(x) \\ &= P_{n+1}(x) - P_{n+1}(x) * \beta(x) - Qe \\ &= P_{n+1}(x) * \{1 - \beta(x)\} - Qe \\ &= P_{n+1}(x) * \alpha(x) - Qe \end{aligned} \qquad (7)$$

Equation (7) reveals that Fin(x) contains the rounding error Qe. In tone correction for a line of interest, the rounding error Qe is propagated to the next line. The density is saved before and after tone correction. Since $P_{n+1}(x)$ and Mo(x) are integer values, Fin(x) is an integer value, too.

In next scanning, Fin(x) stored in the FIFO buffer 806 is referred to as $P_{na}(x)$. The adder 143 adds $P_{na}(x)$ and an integer value Mo(x) calculated by weighting $P_{n+1}(x)$ in next scanning. The sum by the adder 143 is output as tone-corrected image data $P'_n(x)$.

$P'_n(x)$ is calculated by addition/subtraction of $P_{na}(x)$, that is, the integer value Fin(x) and the integer value Mo(x), and is an integer value, too. This integer value already reflects a pixel value of the decimal part that is corrected by a tone correction unit 140. Hence, the third embodiment can save a pixel value of the decimal part even after tone correction without handling the value of the decimal part in subsequent multi-level error diffusion processing.

The tone correction unit 140 in the third embodiment can omit a memory for holding the correction coefficient α, and one multiplier from the arrangement of the tone correction unit 804 shown in FIG. 7 in the first embodiment.

As described above, the third embodiment can suppress the apparatus size because a pixel value of the decimal part after tone correction can be saved without handling the value of the decimal part in multi-level error diffusion processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-274864, filed Oct. 24, 2008, which is hereby incorporated by reference herein in its entirety.

What is claimed is:

1. An image forming apparatus which includes, for respective printing materials of a plurality of colors, a plurality of color image forming sections each for forming a visible image by exposure scanning and development on an image carrier, and forms a color image by superimposing visible images formed on a print medium by the plurality of color image forming sections, each of the plurality of color image forming sections comprising:
    an exposure shift amount storage unit configured to store shift amount information representing a shift amount between an ideal scanning line and an actual scanning line in an exposure scanning direction on the image carrier;
    an image data storage unit configured to store image data to be formed;
    address conversion unit configured to convert a readout address in the image data storage unit, based on the shift amount information stored in the exposure shift amount storage unit, and read out image data in accordance with the converted address;
    a tone correction unit configured to perform, based on the address, tone correction for the image data read out by the address conversion unit;
    a multi-level error diffusion unit configured to perform quantization by multi-level error diffusion processing for the image data having undergone the tone correction by the tone correction unit; and
    an exposure control signal generation unit configured to generate an exposure control signal to perform exposure scanning of the image data, based on a quantization level of the quantization by the multi-level error diffusion unit,
    wherein the multi-level error diffusion unit switches the number of quantization levels based on the shift amount information stored in the exposure shift amount storage unit.

2. The apparatus according to claim 1, wherein
    the tone correction unit performs the tone correction to contain a value of a decimal part in a pixel value of the image data, and
    the multi-level error diffusion unit performs quantization for the image data containing the value of the decimal part.

3. The apparatus according to claim 1, wherein the exposure shift amount storage unit stores, as the shift amount information, information representing a plurality of points on the ideal scanning line on the image carrier and information representing a distance between the ideal scanning line and the actual scanning line at each point.

4. The apparatus according to claim 3, wherein
    the address conversion unit includes
    an inclination calculation unit configured to calculate, for each region of the scanning line based on the shift amount information stored in the exposure shift amount storage unit, inclination information representing a inclination of the actual scanning line in the exposure scanning direction,
    an X address generation unit configured to generate an X address corresponding to the exposure scanning direction out of readout addresses in the image data storage unit,
    an accumulation unit configured to accumulate inclination information for each region corresponding to the X address, and
    a Y address generation unit configured to generate a Y address corresponding to a conveyance direction of the print medium by using a value of an integer part of an accumulation result of the accumulation unit as an offset amount, and
    the tone correction unit generates tone-corrected pixel data from data of two pixels adjacent in a Y address direction, based on a value of a decimal part of the accumulation result of the accumulation unit.

5. The apparatus according to claim 1, wherein the multi-level error diffusion unit switches the number of quantization levels to be smaller for a larger shift amount represented by the shift amount information.

6. The apparatus according to claim 1, wherein the tone correction unit performs the tone correction by propagating, to a pixel value of a next line, a rounding error generated when a pixel value of a line of interest is rounded to an integer value.

7. A method of controlling an image forming apparatus which includes, for respective printing materials of a plurality of colors, a plurality of color image forming sections each for forming a visible image by exposure scanning and development on an image carrier, and forms a color image by superimposing visible images formed on a print medium by the plurality of color image forming sections, the method comprising for each of the plurality of color image forming sections:
    an exposure shift amount acquisition step of acquiring shift amount information representing a shift amount between an ideal scanning line and an actual scanning line in an exposure scanning direction on the image carrier;
    an image data storage step of storing image data to be formed in an image memory;

an address conversion step of converting a readout address in the image memory, based on the shift amount information, and reading out image data in accordance with the converted address;

a tone correction step of performing, based on the address, tone correction for the image data read out in the address conversion step;

a multi-level error diffusion step of performing quantization by multi-level error diffusion processing for the image data having undergone the tone correction in the tone correction step; and an exposure control signal generation step of generating an exposure control signal based on a quantization level of the quantization in the multi-level error diffusion step, wherein the multi-level error diffusion step switches the number of quantization levels based on the shift amount information stored in the exposure shift amount storage step.

8. An image forming apparatus which generates an exposure control signal for forming an image on a print medium by exposure scanning on an image carrier, comprising:

an image data storage unit configured to store image data to be formed;

a read out unit configured to convert a readout address in the image data storage unit, based on a shift amount between an ideal scanning line and an actual scanning line in an exposure scanning direction on the image carrier, and read out image data in accordance with the converted address;

a tone correction unit configured to perform tone correction for the image data read out by the read out unit by performing weighted interpolation for each pixel values of a pixel of interest and pixels in a line adjacent to the pixel of interest according to the shift amount;

a quantization unit configured to perform quantization of the tone corrected image data; and a generation unit configured to generate an exposure control signal to perform exposure scanning of the image data quantized by the quantization unit;

wherein the quantization unit switches the number of quantization levels based on the shift amount.

9. The apparatus according to claim 8, wherein further comprising exposure shift amount storage unit configured to store shift amount information representing the shift amount.

10. An image forming apparatus which generates an exposure control signal for forming an image on a print medium by exposure scanning on an image carrier, comprising:

an image data storage unit configured to store image data to be formed;

a read out unit configured to convert a readout address in the image data storage unit, based on a shift amount between an ideal scanning line and an actual scanning line in an exposure scanning direction on the image carrier, and read out image data in accordance with the converted address;

a tone correction unit configured to perform tone correction for the image data read out by the read out unit by performing weighted interpolation for each pixel values of a pixel of interest and pixels in a line adjacent to the pixel of interest according to the shift amount; and a generation unit configured to generate an exposure control signal to perform exposure scanning of the image data, based on the tone corrected image data;

wherein the tone correction unit comprises:

an output unit configured to output an integer part obtained by rounding a decimal part of a result of performing weighted interpolation for a pixel value of a pixel of interest in the (n+1)th line based on the shift amount of the (n+1)th line; and a calculation unit configured to calculate a difference value between the pixel value of the pixel of interest in the (n+1)th line and the integer part in the (n+1)th line, wherein the tone correction unit performs tone correction for the pixel of interest in the (n+1)th line, based on the integer part in the (n+1)th line output from the output unit and a difference value obtained by applying the calculation by the calculation unit to pixels adjacent to the pixel of interest in the nth line, and wherein the tone correction unit outputs, as a tone correction result for the pixel of interest in the (n+1)th line, a result obtained by adding the integer the integer part in the (n+1)th line output from the output unit to the difference value obtained by applying the calculation by the calculation unit to pixels adjacent to the pixel of interest in the nth line.

11. The apparatus according to claim 10, wherein the tone correction unit generates tone-corrected pixel data by performing weighted interpolation for data of two pixels adjacent in the Y address direction.

12. A method of controlling an image forming apparatus which generates an exposure control signal for forming an image on a print medium by exposure scanning on an image carrier, comprising:

an image data storage step of storing image data to be formed in an image memory;

a read out step of converting a readout address in the image memory, based on a shift amount between an ideal scanning line and an actual scanning line in an exposure scanning direction on the image carrier, and reading out image data in accordance with the converted address;

a tone correction step of performing tone correction for the image data read out in the read out step by performing weighted interpolation for each pixel values of a pixel of interest and pixels in a line adjacent to the pixel of interest according to the shift amount;

a quantization step of performing quantization of the tone corrected image data; and a generation step of generating an exposure control signal to perform exposure scanning of the image data quantized in the quantization step, wherein the quantization step switches the number of quantization levels based on the shift amount.

13. A method of controlling an image forming apparatus which generates an exposure control signal for forming an image on a print medium by exposure scanning on an image carrier, comprising:

an image data storage step of storing image data to be formed in an image memory;

a read out step of converting a readout address in the image memory, based on a shift amount between an ideal scanning line and an actual scanning line in an exposure scanning direction on the image carrier, and reading out image data in accordance with the converted address;

a tone correction step of performing tone correction for the image data read out in the read out step by performing weighted interpolation for each pixel values of a pixel of interest and pixels in a line adjacent to the pixel of interest according to the shift amount; and a generation step of generating an exposure control signal to perform exposure scanning of the image data, based on the tone corrected image data;

wherein the tone correction step comprises:

an output step of outputting an integer part obtained by rounding a decimal part of a result of performing weighted interpolation for a pixel value of a pixel of interest in the (n+1)th line based on the shift amount of the (n+1)th line; and a calculation step of calculating a difference value between the pixel value of the pixel of interest in the (n+1)th line and the integer part in the (n+1)th line, wherein the tone correction step performs tone correction for the pixel of interest in the (n+1)th line, based on the integer part in the (n+1)th line output from the output step and a difference value obtained by applying the calculation in the calculation step to pixels adjacent to the pixel of interest in the nth line, and wherein the tone correction step outputs, as a tone correction result for the pixel of interest in the (n+1)th line, a result obtained by adding the integer the integer part in the (n+1)th line output from the output step to the difference value obtained by applying the calculation by the calculation step to pixels adjacent to the pixel of interest in the nth line.

14. A non-transitory computer-readable storage medium storing a program for controlling a computer to control an image forming apparatus which includes, for respective printing materials of a plurality of colors, a plurality of color image forming sections each for forming a visible image by exposure scanning and development on an image carrier, and forms a color image by superimposing visible images formed on a print medium by the plurality of color image forming sections, each of the plurality of color image forming sections, the program controlling the computer to function as:

an exposure shift amount storage unit configured to store shift amount information representing a shift amount between an ideal scanning line and an actual scanning line in an exposure scanning direction on the image carrier;

an image data storage unit configured to store image data to be formed;

an address conversion unit configured to convert a readout address in the image data storage unit, based on the shift amount information stored in the exposure shift amount storage unit, and read out image data in accordance with the converted address;

a tone correction unit configured to perform, based on the address, tone correction for the image data read out by the address conversion unit;

a multi-level error diffusion unit configured to perform quantization by multi-level error diffusion processing for the image data having undergone the tone correction by the tone correction unit; and an exposure control signal generation unit configured to generate an exposure control signal to perform exposure scanning of the image data, based on a quantization level of the quantization by the multi-level error diffusion unit, wherein the multi-level error diffusion unit switches the number of quantization levels based on the shift amount information stored in the exposure shift amount storage unit.

15. A non-transitory computer-readable storage medium storing a program for controlling a computer to control an image forming apparatus which generates an exposure control signal for forming an image on a print medium by exposure scanning on an image carrier, the program controlling the computer to function as:

an image data storage unit configured to store image data to be formed;

a read out unit configured to convert a readout address in the image data storage unit, based on a shift amount between an ideal scanning line and an actual scanning line in an exposure scanning direction on the image carrier, and read out image data in accordance with the converted address;

a tone correction unit configured to perform tone correction for the image data read out by the read out unit by performing weighted interpolation for each pixel values of a pixel of interest and pixels in a line adjacent to the pixel of interest according to the shift amount;

quantization unit configured to perform quantization of the tone corrected image data; and a generation unit configured to generate an exposure control signal to perform exposure scanning of the image data quantized by the quantization unit, wherein the quantization unit switches the number of quantization levels based on the shift amount.

16. A non-transitory computer-readable storage medium storing a program for controlling a computer to control an image forming apparatus which generates an exposure control signal for forming an image on a print medium by exposure scanning on an image carrier, the program controlling the computer to function as:

an image data storage unit configured to store image data to be formed;

a read out unit configured to convert a readout address in the image data storage unit, based on a shift amount between an ideal scanning line and an actual scanning line in an exposure scanning direction on the image carrier, and read out image data in accordance with the converted address;

a tone correction unit configured to perform tone correction for the image data read out by the read out unit by performing weighted interpolation for each pixel values of a pixel of interest and pixels in a line adjacent to the pixel of interest according to the shift amount; and a generation unit configured to generate an exposure control signal to perform exposure scanning of the image data, based on the tone corrected image data;

wherein the tone correction unit comprises:

an output unit configured to output an integer part obtained by rounding a decimal part of a result of performing weighted interpolation for a pixel value of a pixel of interest in the (n+1)th line based on the shift amount of the (n+1)th line; and a calculation unit configured to calculate a difference value between the pixel value of the pixel of interest in the (n+1)th line and the integer part in the (n+1)th line, wherein the tone correction unit performs tone correction for the pixel of interest in the (n+1)th line, based on the integer part in the (n+1)th line output from the output unit and a difference value obtained by applying the calculation by the calculation unit to pixels adjacent to the pixel of interest in the nth line, and wherein the tone correction unit outputs, as a tone correction result for the pixel of interest in the (n+1)th line, a result obtained by adding the integer the integer part in the (n+1)th line output from the output unit to the difference value obtained by applying the calculation by the calculation unit to pixels adjacent to the pixel of interest in the nth line.

* * * * *